US008711444B2

(12) United States Patent
Oyama

(10) Patent No.: US 8,711,444 B2
(45) Date of Patent: Apr. 29, 2014

(54) LIGHT-SOURCE CONTROL DEVICE, LIGHT-SOURCE CONTROL METHOD, IMAGE READING DEVICE, AND IMAGE FORMING APPARATUS

(75) Inventor: Tadaaki Oyama, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 103 days.

(21) Appl. No.: 13/420,829

(22) Filed: Mar. 15, 2012

(65) Prior Publication Data

US 2012/0236373 A1 Sep. 20, 2012

(30) Foreign Application Priority Data

Mar. 18, 2011 (JP) ................................. 2011-061681

(51) Int. Cl.
*H04N 1/04* (2006.01)
(52) U.S. Cl.
USPC ........... 358/475; 358/509; 358/474; 315/224; 315/172; 347/129; 347/216
(58) Field of Classification Search
USPC ................ 358/474, 475, 509, 482, 483, 505; 315/224, 172, 209, 193; 347/129, 216, 347/220, 475
See application file for complete search history.

(56) References Cited

U.S. PATENT DOCUMENTS

| 5,055,840 | A | * | 10/1991 | Bartlett | 341/31 |
| 5,510,607 | A | * | 4/1996 | Ishikawa | 235/462.2 |
| 5,815,291 | A | * | 9/1998 | Shono et al. | 358/504 |
| 6,084,692 | A | * | 7/2000 | Ohtani et al. | 358/509 |
| 7,088,321 | B1 | * | 8/2006 | Parker | 345/83 |
| 7,173,234 | B2 | * | 2/2007 | Hiromatsu | 250/226 |
| 7,449,666 | B2 | * | 11/2008 | Kaihotsu | 250/205 |
| 7,498,553 | B2 | * | 3/2009 | Shimokawa | 250/205 |
| 7,889,160 | B2 | * | 2/2011 | Yoo | 345/83 |
| 7,898,507 | B2 | * | 3/2011 | Takei et al. | 345/76 |
| 8,384,984 | B2 | * | 2/2013 | Maxik et al. | 359/291 |
| 8,482,824 | B2 | * | 7/2013 | Nagasaka | 358/509 |
| 8,491,159 | B2 | * | 7/2013 | Recker et al. | 362/276 |

(Continued)

FOREIGN PATENT DOCUMENTS

| JP | 3368890 B2 | 11/2002 |
| JP | 3930233 B2 | 3/2007 |
| JP | 2007-110624 A | 4/2007 |
| JP | 2009260953 A | 11/2009 |

OTHER PUBLICATIONS

English language abstract for JP 2001-290458 corresponds to JP 3368890.

(Continued)

*Primary Examiner* — Negussie Worku
(74) *Attorney, Agent, or Firm* — Harness, Dickey & Pierce, P.L.C.

(57) ABSTRACT

A light-source control device includes a light source including a first light emitter for emitting light and a second light emitter for emitting light due to the light emitted by the first light emitter; a constant current unit configured to maintain a current constant that is input via the light source from a power supply; a switching unit configured to switch the current to be input to the constant current unit at a designated duty ratio and cycle; and a control unit configured to control the current applied to the light source so that a rise transition time and a fall transition time of the current applied to the light source are nearly equal to each other.

15 Claims, 19 Drawing Sheets

(56) References Cited

U.S. PATENT DOCUMENTS

| | | | |
|---|---|---|---|
| 8,492,987 B2* | 7/2013 | Nuhfer et al. | 315/246 |
| 2011/0249069 A1 | 10/2011 | Oyama | |
| 2012/0026550 A1* | 2/2012 | Tsukahara | 358/1.15 |
| 2013/0038228 A1* | 2/2013 | Hu | 315/193 |

OTHER PUBLICATIONS

English language abstract for JP 2002-042337 corresponds to JP 3930233.

* cited by examiner

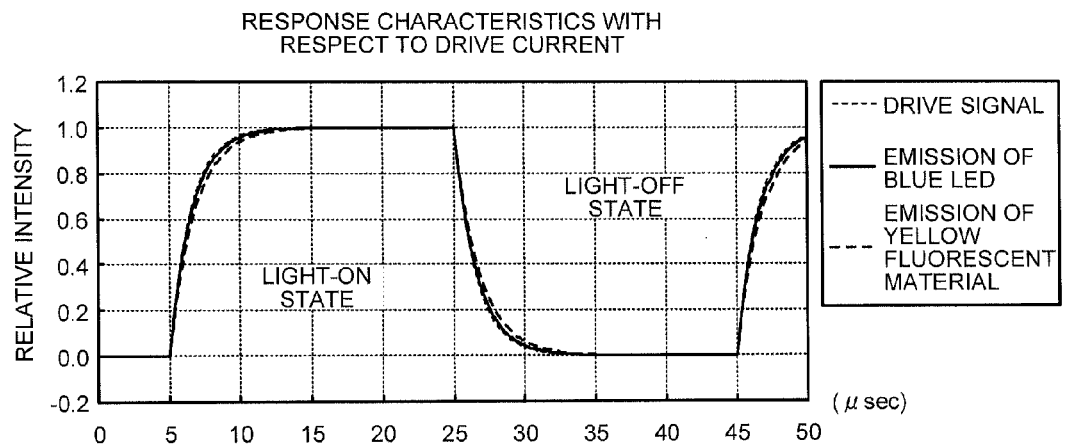
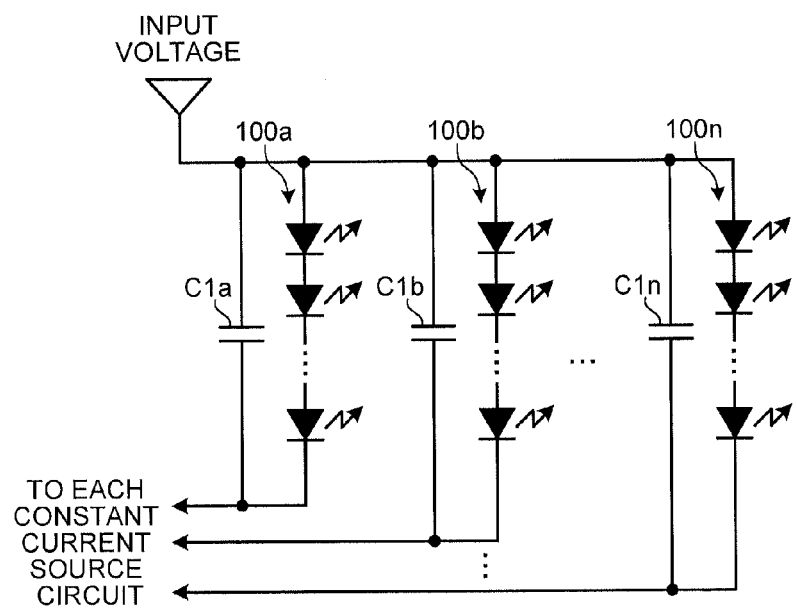

CURRENT BEHAVIOR OF CAPACITOR

CURRENT BEHAVIOR OF LED

CURRENT BEHAVIOR OF CONSTANT CURRENT LOAD

CURRENT BEHAVIOR OF CAPACITOR

CURRENT BEHAVIOR OF CONSTANT CURRENT LOAD

CURRENT BEHAVIOR OF LED

ACTUAL MEASURED VALUE OF LED

RESPONSE CHARACTERISTICS OF BLUE LED

RESPONSE CHARACTERISTICS OF YELLOW FLUORESCENT MATERIAL

LIGHT-SOURCE CONTROL DEVICE, LIGHT-SOURCE CONTROL METHOD, IMAGE READING DEVICE, AND IMAGE FORMING APPARATUS

CROSS-REFERENCE TO RELATED APPLICATIONS

The present application claims priority to and incorporates by reference the entire contents of Japanese Patent Application No. 2011-061681 filed in Japan on Mar. 18, 2011.

BACKGROUND OF THE INVENTION

1. Field of the Invention

The present invention relates to a light-source control device, a light-source control method, an image reading device, and an image forming apparatus.

2. Description of the Related Art

A conventional method is known which uses a chip light emitting diode (LED) as a light source that is included in a scanner device and emits white light. LEDs have a superior responsiveness than conventional xenon lamps; therefore, the lighting intensity of an LED can be controlled by using a pulse width modulation (PWM) drive to control the lighting-up time. A method of controlling LEDs using PWM drives has already been put to practical use.

For example, Japanese Patent No. 3368890 discloses a technology in which, when a color is represented by using multiple LEDs that each have a different color, the pulse width of a PWM signal for the PWM drive is adjusted, a drive current is reduced for an LED for which color deviation is large, and the drive current is allocated to the other LEDs. According to Japanese Patent No. 3368890, it is possible to reduce color variation within a plane or line where the variations are due to variations in the chromaticity of individual LEDs, or the like.

An LED that emits white light can be configured from a blue LED that emits blue light and a yellow fluorescent material that is installed around the blue LED and emits a yellow fluorescence. With this configuration, the yellow fluorescent material is excited by the emission of the blue LED so that it emits light, and pseudo white light emission can be obtained by using the emission of the yellow fluorescent material and the emission of the blue LED. In the following, a light emitter that is configured from a blue LED and a yellow fluorescent material is simply referred to as a white LED.

If the white LED is lighted up by using a PWM drive according to a conventional technology, there is a problem in that the color of light emitted by the white LED changes in accordance with any change in the duty ratio of the PWM signal during adjustment of the lighting intensity.

A detailed explanation is given of a change in color in accordance with a change in the duty ratio of the PWM signal during the PWM drive. FIGS. 18A and 18B represent the emission response characteristics of a white LED with respect to the drive current. A blue LED and a yellow fluorescent material of the white LED have different emission response characteristics with respect to the drive current. Specifically, as illustrated in FIG. 18A, the blue LED responds to the drive current instantaneously, and the intensity of emitted light reaches its maximum light intensity at almost the same time as the drive current rises. Conversely, as illustrated in FIG. 18B, the response of the yellow fluorescent material with respect to the drive current is governed by a predetermined time constant, and a certain amount of time is required from when the drive current rises to when the intensity of emitted light reaches its maximum light intensity.

FIG. 19 illustrates an exemplary configuration of a circuit for driving an LED that is the light source of a scanner device. In this example, groups 600a, 600b, ..., 600n, in which multiple LEDs are connected in series, are driven (hereafter, a group having multiple LEDs connected in series is referred to as an LED array, and the groups 600a, 600b, ..., 600n are described as LED arrays 600a, 600b, ..., 600n). An input voltage is boosted by a booster circuit that includes a coil L100, a zener diode ZD100, a transistor Q100, and a capacitor C100 in accordance with a booster clock, and the boosted voltage is applied to one end of each of the LED arrays 600a, 600b, ..., 600n. The other end of each of the LED arrays 600a, 600b, ..., 600n is connected to a constant current circuit.

FIG. 20 illustrates an exemplary circuit configuration of a constant current circuit. For example, a constant current source that includes an operational amplifier OP100, a reference voltage E100, a load resistor R100, and a transistor Q101 is often used for a PWM drive for a white LED, as illustrated in FIG. 20. The PWM drive for the LED arrays 600a, 600b, ..., 600n (abbreviated as LED D600 in the drawing) is performed by controlling a switch circuit SW100 so that it is turned on/off in accordance with a PWM signal and by switching on/off the transistor Q101.

FIGS. 21A and 21B illustrate an example of the characteristics of the constant current circuit illustrated in FIG. 20. In this constant current circuit, when the current falls, the current pathway is instantly blocked due to switching of the transistor Q101; therefore, sharp characteristics are obtained, as illustrated in FIG. 21B. This example shows that the current falls to zero about 60 nanoseconds (nsecs) after the transistor Q101 is turned off.

In this constant current source, the load resistor R100 acts as a current-limiting load; therefore, the characteristics obtained when the current rises are slower than the characteristics obtained when the current falls. FIG. 21A illustrates an example of a time change in the current when the current rises. This example shows the current reaches a constant current about 2.8 μsec after the transistor Q101 is turned on.

If the difference between the current values obtained before and after the current is changed is 100%, the time it takes to change from 10% to 90% when the current rises is referred to as the rise transition time. Similarly, if the difference between the current values obtained before and after the current is changed is 100%, the time it takes to change from 90% to 10% when the current falls is referred to as the fall transition time.

FIG. 22 illustrates an example of the light emission behavior obtained when the white LED that has the characteristics illustrated in FIGS. 18A and 18B are driven by using a constant current source that has the characteristics illustrated in FIGS. 21A and 21B. The drive current slowly rises, and the emission by the yellow fluorescent material in the white LED slowly responds to the drive current. Therefore, during the rise transition time, the blue LED and the yellow fluorescent material in the white LED enter a light-on state over the same period of time (the period A in FIG. 22).

Conversely, during the fall transition time, as the blue LED has superior emission response characteristics with respect to the drive current, the blue LED enters a light-off state at almost the same time as the drive current is changed. However, the yellow fluorescent material has inferior emission response characteristics with respect to the drive current as compared to the blue LED; therefore, it takes time to follow a change in the drive current (the period B in FIG. 22). During the fall transition time, a state occurs in which, although the blue LED has already entered a light-off state, the yellow fluorescent material still emits light (residual light), which is illustrated as the area Ye in FIG. 22. In a state where there is residual light from the yellow fluorescent material, the white LED emits light of a different color (yellow) to the original emitted light, which was white.

This indicates that the light emission time of the yellow fluorescent material becomes longer than that of the blue LED during one cycle of lighting on/off of the white LED. Therefore, if the duty ratio of the drive current becomes lower or if the cycle of the drive current becomes shorter, the ratio of the light emission time of the yellow fluorescent material to the light emission time of the white LED relatively increases.

Thus, the color of the white LED is changed in accordance with a change in the duty ratio of the drive current or the cycle of the drive current. FIG. 23 illustrates an example of the actual measured values of changes in the color of the white LED, where they are represented on a CIE-xy chromaticity diagram. As illustrated in FIG. 23, when the duty ratio of the drive current becomes lower or when the cycle of the drive current becomes shorter, the color of light emitted by the white LED is changed such that the values on the chromaticity coordinates increase in both the x direction and the y direction. This means that the actual change in the color is from white to a yellowish color.

As described above, in the case of a white light source that includes a combination of light sources that each have different response characteristics with respect to the drive current, it is difficult to keep the same chromaticity during the lighting intensity adjustment that is performed by changing the duty or the cycle of the drive current. Therefore, there is a problem in that a change in the duty or the cycle of the drive current causes a change in the color of the light source.

Japanese Patent No. 3368890 described above is used to reduce color deviation that is caused by an LED unit that includes LEDs in colors R, G, and B and is not used to reduce a change in the chromaticity that occurs when being driven by PWM signals. Therefore, according to the technology disclosed in Japanese Patent No. 3368890, it is difficult to reduce a change in the chromaticity of individual LEDs.

Therefore, there is a need for correct control of a light source that includes a combination of light emitters that each have different response characteristics with respect to a drive current.

SUMMARY OF THE INVENTION

It is an object of the present invention to at least partially solve the problems in the conventional technology.

According to an embodiment, there is provided a light-source control device that includes a light source including a first light emitter for emitting light and a second light emitter for emitting light due to the light emitted by the first light emitter; a constant current unit configured to maintain a current constant that is input via the light source from a power supply; a switching unit configured to switch the current to be input to the constant current unit at a designated duty ratio and cycle; and a control unit configured to control the current applied to the light source so that a rise transition time and a fall transition time of the current applied to the light source are nearly equal to each other.

According to another embodiment, there is provided an image reading device that includes the light-source control device according to the above embodiment; and a light receiving unit configured to receive reflected light of light emitted by the light source and convert the reflected light into an electric signal.

According to still another embodiment, there is provided an image forming apparatus that includes the light-source control device according to the above embodiment; a light receiving unit configured to receive reflected light of light emitted by the light source and convert the reflected light into an electric signal; and an image forming unit configured to form an image in accordance with the electric signal output from the light receiving unit.

According to still another embodiment, there is provided a light-source control method that includes maintaining, by a constant current unit, a current constant that is input via a light source from a power supply, the light source including a first light emitter for emitting light and a second light emitter for emitting light due to the light emitted by the first light emitter; switching the current to be input to the constant current unit at a designated duty ratio and cycle; and controlling the current applied to the light source so that a rise transition time and a fall transition time of the current applied to the light source are nearly equal to each other.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a graph that illustrates an example of the response characteristics of the white LED with respect to the drive current according to a first embodiment of the present invention;

FIG. 2 is a circuit diagram that illustrates an exemplary drive circuit of the white LED according to the first embodiment of the present invention;

DETAILED DESCRIPTION OF THE PREFERRED EMBODIMENTS

First Embodiment

Figure 3:
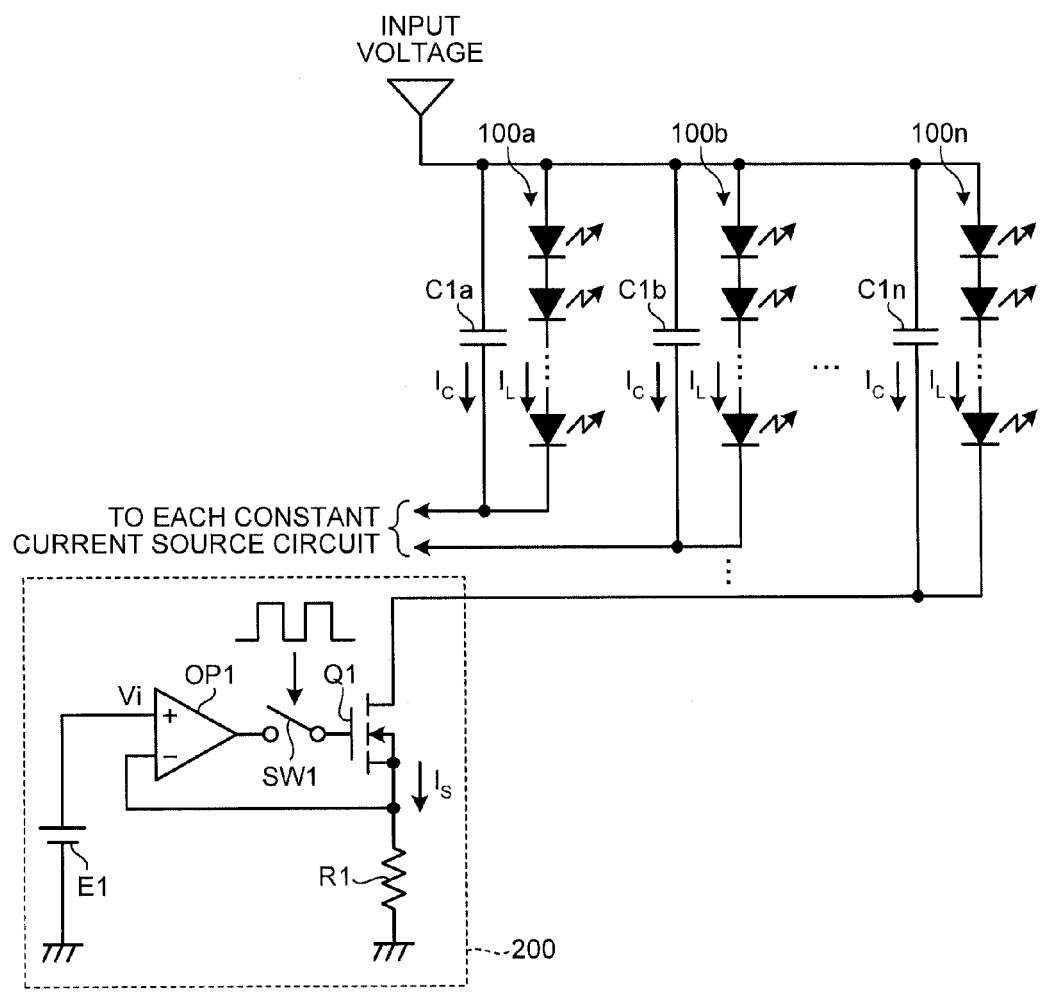
FIG. 3 is a circuit diagram that illustrates an exemplary drive circuit of the white LED according to the first embodiment of the present invention.

A first embodiment of a light-source control device according to the present invention is explained in detail below with reference to the accompanying drawings. Before the present invention is explained, various terms to be used in the following are defined. First, a light emitter that includes a blue LED and a yellow fluorescent material and that emits pseudo white light due to the light emission of the blue LED and the yellow fluorescent material is referred to as a white LED. A yellow phosphorescent material is used in place of the yellow fluorescent material.

The rise transition time is, if the difference between the current values obtained before and after the current is changed is 100%, the time it takes to change from a predetermined percentage (e.g., 10%) on the lower value side to a predetermined percentage (e.g., 90%) on the higher value side when the drive current rises. Similarly, the fall transition time is, if the difference between the current values obtained before and after the current is changed is 100%, the time it takes to change from a predetermined percentage on the higher value side to a predetermined percentage on the lower value side.

With respect to the emission of the blue LED and the yellow fluorescent material, the time it takes during the lighting-up from the time the drive current rises to the time when the blue LED or the yellow fluorescent material reaches a light-emitting state is referred to as a response time during the lighting-up. Similarly, the time it takes during the lighting-down from the time the drive current falls to the time when the blue LED or the yellow fluorescent material reaches a non light-emitting state is referred to as a response time during the lighting-down. The light-emitting state is a state with a predetermined emission intensity with respect to the value of the drive current or with an emission intensity of a predetermined percentage (e.g., 90%) of the above emission intensity. The non light-emitting state is a state with an emission intensity of zero or with an emission intensity of a predetermined percentage (e.g., 10%) of the emission intensity with respect to the value of the drive current.

FIG. 1 illustrates an example of the response characteristics of the white LED with respect to the drive current according to the first embodiment. In FIG. 1, the horizontal axis represents a time, and the vertical axis represents a relative value that is obtained by normalizing the current (drive current) of the drive signal and the emission intensity of each of the blue LED and the yellow fluorescent material. The same applies to the same types of drawings that are described below.

As illustrated in FIG. 1, according to the first embodiment, the rise transition time and the fall transition time of the drive current for driving the white LED are controlled such that they become nearly equal to the response time of the yellow fluorescent material during the lighting-up and the response time of the yellow fluorescent material during the lighting-down. The blue LED can follow the behavior of the drive current instantaneously; therefore, their response times during the lighting-up and during the lighting-down are nearly equal to the response times of the yellow fluorescent material during the lighting-up and during the lighting-down.

In a more specific example, the rise transition time and the fall transition time of the drive current for driving the white LED are controlled so that, when the duty ratio or the cycle of the drive current is changed within a predetermined range, a change in the chromaticity of the color of light emitted by the white LED falls within a predetermined range.

The drive current for driving the white LED is controlled in the above-described manner, whereby it is possible to prevent a change in the color of light emitted by the white LED when the duty ratio or the cycle of the drive current is changed.

Next, a more detailed explanation is given of the configuration for controlling the drive current, as illustrated in FIG. 1. FIG. 2 illustrates an exemplary drive circuit of the white LED according to the first embodiment. As illustrated in FIG. 2, according to the first embodiment, a capacitor such as a condenser is connected to a white LED in parallel.

Figure 20:
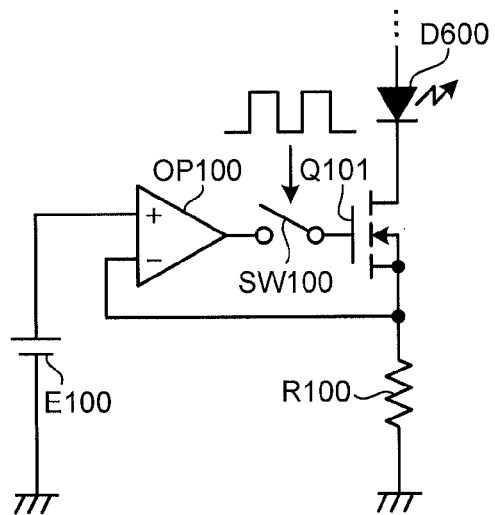
FIG. 20 is a circuit diagram that illustrates an exemplary circuit configuration of a constant current circuit.
Figure 21A:
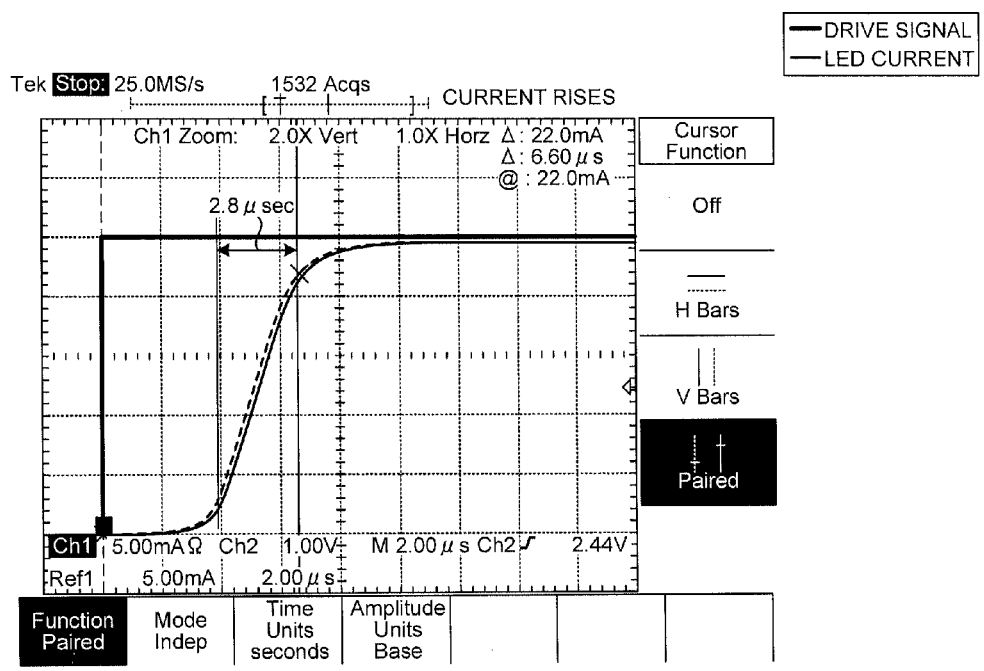
FIGS. 21A and 21B are graphs that illustrate an example of the characteristics of the constant current circuit.
Figure 21B:
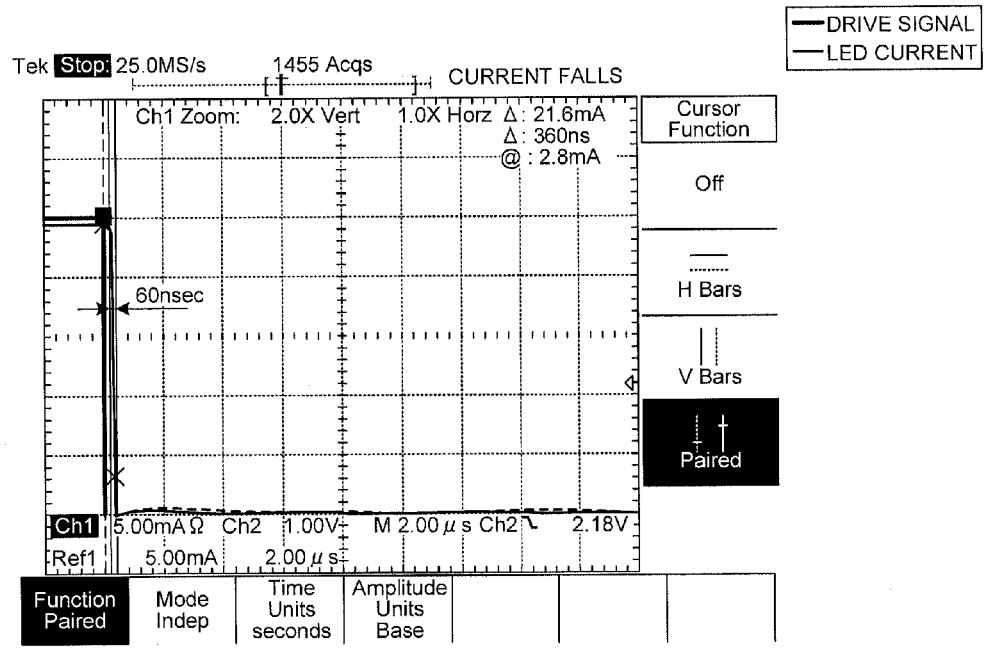
Figure 22:
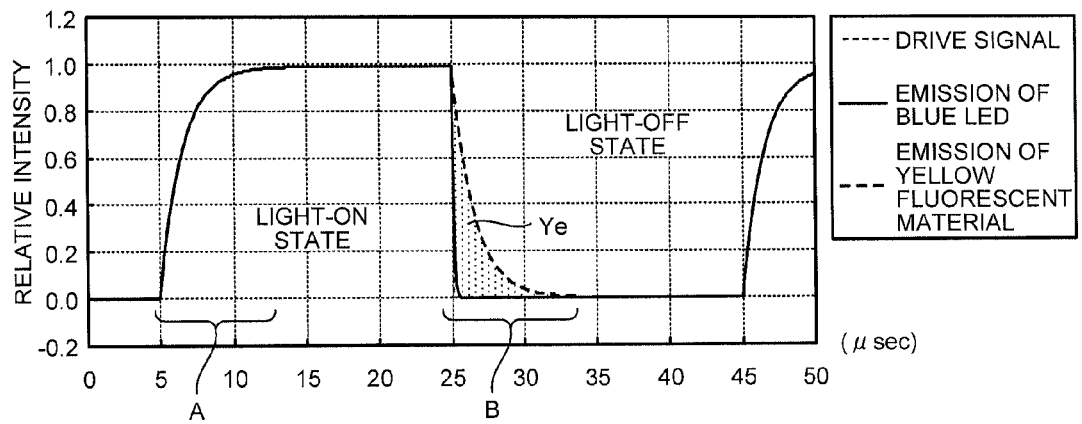
FIG. 22 is a graph that illustrates an example of the light emission behavior obtained when the white LED is driven by using a conventional technology.
Figure 23:
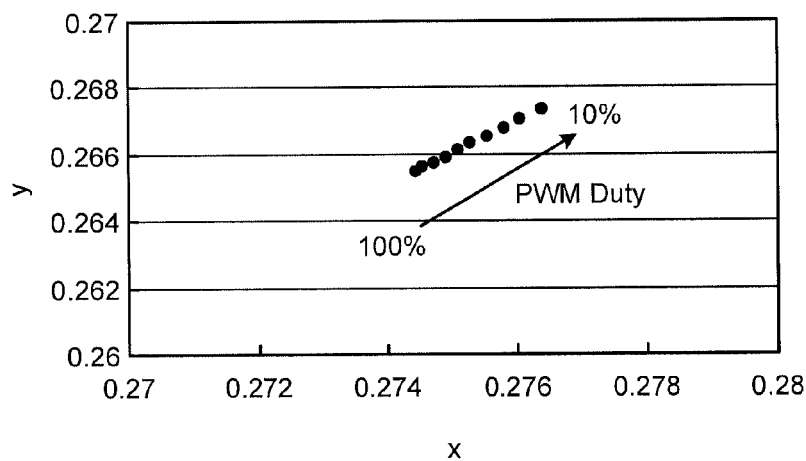
FIG. 23 is a graph that illustrates an example of the actual measured values of changes in the color of the white LED that is driven by using a conventional technology, where they are represented on a CIE-xy chromaticity diagram.

More specifically, an input voltage is applied to the anode terminal of each group 100*a*, 100*b*, . . . , 100*n* in which multiple white LEDs are serially connected (hereafter, a group having multiple white LEDs serially connected is referred to as a white LED array, and the groups 100*a*, 100*b*, . . . , 100*n* are described as white LED arrays 100*a*, 100b, ..., 100n). The cathode terminal of each of the white LED arrays 100a, 100b, ..., 100n is individually connected to a constant current circuit. Capacitors C1a, C1b, ..., C1n are connected to the white LED arrays 100a, 100b, ..., 100n, respectively, in parallel. The constant current circuit may use, for example, a sink-type configuration that includes a transistor, a switch circuit, a load resistor, an operational amplifier, and a reference source, as illustrated in FIG. 20.

With the configuration illustrated in FIG. 2, during the PWM drive of the constant current circuit, high-frequency components (shapely changing components) of the drive current due to its current change flow through the low-impedance capacitors C1a, C1b, ..., C1n, and the other components (low-frequency components) flow through the white LED arrays 100a, 100b, ..., 100n. Therefore, the drive current rises and falls in a smooth manner, and their characteristics become similar to the response characteristics of the yellow fluorescent material during the lighting-up and the lighting-down. Thus, as illustrated in FIG. 1, in the white LED, the response characteristics of the blue LED during the lighting-up and the lighting-down can become equal to the response characteristics of the yellow fluorescent material during the lighting-up and the lighting-down. Hence, it is possible to prevent a change in the color (a change in the chromaticity) of the white LED that is caused by a change in the duty ratio of the drive current.

It is preferable to select the capacitance of each of the capacitors C1a, C1b, ..., C1n such that the rise transition time and the fall transition time of the current flowing through the white LED arrays 100a, 100b, ..., 100n become close to the time constants of the response characteristics of the yellow fluorescent material during the lighting-up and the lighting-down, whereby it is possible to effectively prevent a change in the chromaticity of the white LED.

A detailed explanation is given of the emission control according to the first embodiment. FIG. 3 illustrates an exemplary configuration of a constant current circuit 200 that is connected to the white LED arrays 100a, 100b, ..., 100n in addition to the configuration above described in FIG. 2. In FIG. 3, the same components as those described in FIG. 2 are denoted by the same reference marks, and their detailed explanations are omitted. The constant current circuit 200 includes a transistor Q1 including an N-channel metal-oxide semiconductor field-effect transistor (MOSFET), a resistive element R1 that is a load resistor, an operational amplifier OP1, a switch circuit SW1, and a reference source E1. The constant current circuit 200 is a constant current sink circuit.

In the constant current circuit 200, the on/off states of the switch circuit SW1 are changed by using PWM signals that are generated by a timing-clock generating unit (not illustrated in the drawing). For example, the timing-clock generating unit can generate a PWM signal that has the duty ratio and the cycle designated by a higher-level controller, or the like. When the switch circuit SW1 is in the on state, the constant current circuit 200 operates such that the positive/negative differential input of the operational amplifier OP1 has the same potential. In other words, if the reference voltage E1 is the voltage "$V_i$", the resistive element R1 has the resistance value "R", and the current "$I_S$" is output from the source of the transistor Q1, then $V_i = R \times I_S$. Therefore, if the reference voltage E1 and the resistive element R1 are fixed, the constant current circuit 200 operates such that the current $I_S$ output from the transistor Q1 is constant.

Figure 4A:
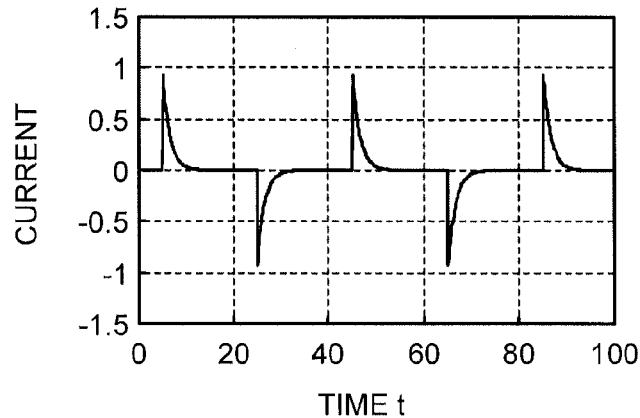
FIG. 4A is a graph that illustrates an example of the behavior of the current in the drive circuit of the white LED according to the first embodiment of the present invention.
Figure 4B:
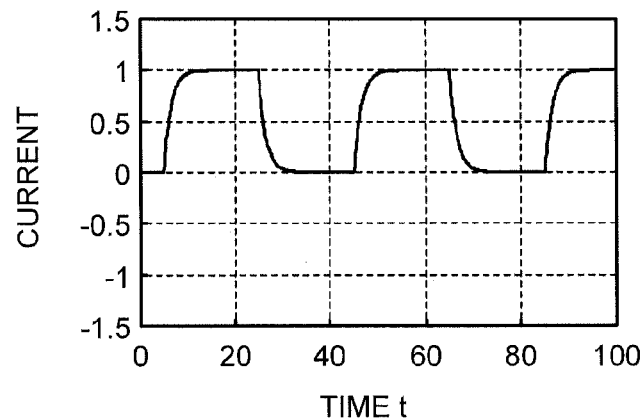
FIG. 4B is a graph that illustrates an example of the behavior of the current in the drive circuit of the white LED according to the first embodiment of the present invention.
Figure 4C:
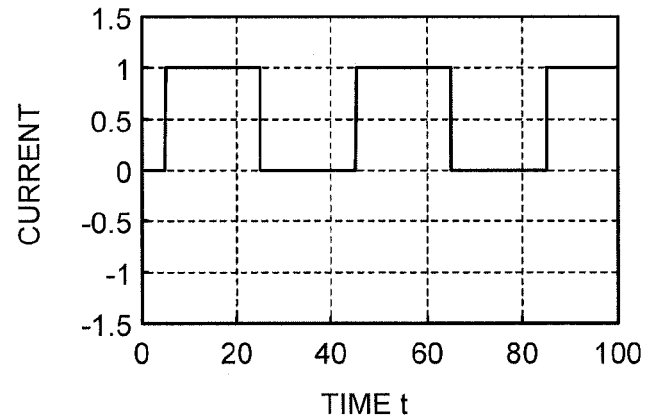
FIG. 4C is a graph that illustrates an example of the behavior of the current in the drive circuit of the white LED according to the first embodiment of the present invention.

With reference to FIGS. 4A to 4C, an explanation is given of the behavior of the current in each unit illustrated in FIG. 3 when the on/off state of the switch circuit SW1 is changed with a duty ratio of 1:1. In FIGS. 4A to 4C, the vertical axis represents the current value, and the horizontal axis represents the time.

FIG. 4A illustrates an example of the behavior of the current in the capacitor C1n that is connected in parallel to the white LED array 100n. As described above, in the constant current circuit 200, the waveform of the current flowing into the drain of the transistor Q1 becomes a rectangular waveform due to turning on/off of the transistor Q1, and high-frequency components of the rectangular wave flow into the low-impedance capacitor C1n (the current $I_C$). Specifically, the current $I_C$ in the capacitor C1n behaves such that the current $I_C$ sharply rises from the edge of the rectangular wave and then attenuates (on the rising portion of the current $I_S$), as illustrated in FIG. 4A.

FIG. 4B illustrates an example of the behavior of the current in each white LED of the white LED array 100n. The current flowing through the white LED array 100n includes components (low-frequency components) that are other than the components flowing through the capacitor C1n and that are included in the square-wave current that flows into the drain of the transistor Q1. Therefore, as illustrated in FIG. 4B, the current $I_L$ in the white LED array 100n behaves such that the rise transition time and the fall transition time are much longer than those of the rectangular wave, i.e., gradual rising and falling characteristics.

FIG. 4C illustrates an example of the behavior of the current in a constant current load, i.e., the resistive element R1. As described above, the current flowing into the drain of the transistor Q1 is the sum of the current $I_C$ flowing through the capacitor C1n and the current $I_L$ flowing through the white LED array 100n. If the gate current hardly flows through the transistor Q1, the current flowing into the drain is nearly equal to the current $I_S$ output from the source; therefore, the current flowing through the resistive element R1 behaves as a rectangular wave, as illustrated in FIG. 4C.

As described above, the capacitor is connected in parallel to the white LED so that it is possible to obtain a longer rise transition time and a longer fall transition time of the drive current in the white LED. For the white LED, the response time of the blue LED during the lighting-down becomes closer to the response time of the yellow fluorescent material during the lighting-down due to its response characteristics, whereby it is possible to reduce residual emission of the yellow fluorescent material during the lighting-down. It is preferable to appropriately select the capacitance of a capacitor that is connected in parallel to a white LED so that the response time of the blue LED during the lighting-down becomes closer to the response time of the yellow fluorescent material during the lighting-down.

First Modified Example of First Embodiment

Figure 5:
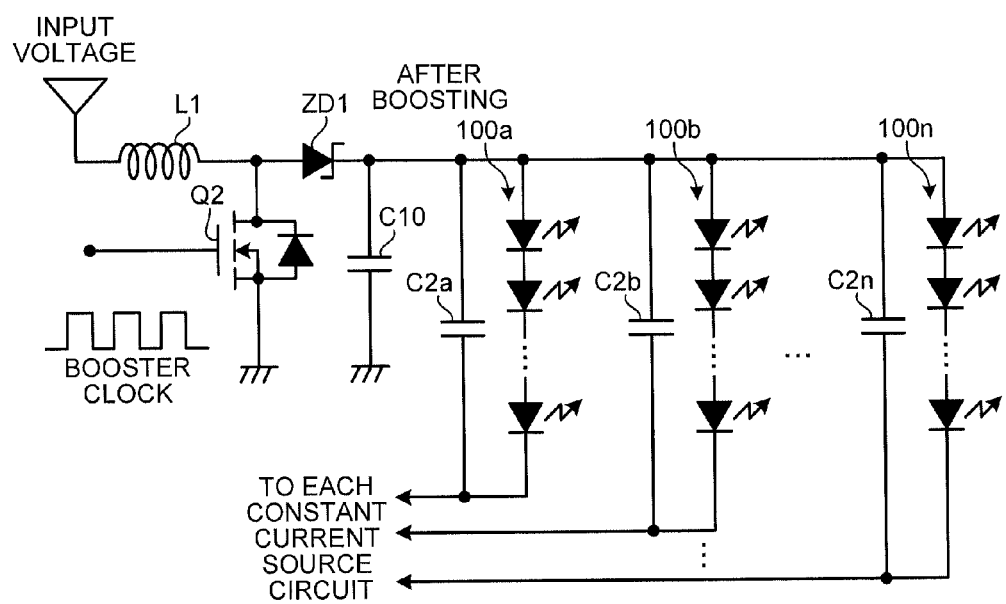
FIG. 5 is a circuit diagram that illustrates an exemplary drive circuit of a white LED according to a first modified example of the first embodiment of the present invention.

FIG. 5 illustrates an exemplary configuration of a drive circuit of a white LED according to a first modified example of the above-described first embodiment. In FIG. 5, the same components as those described in FIG. 2 are denoted by the same reference marks, and their detailed explanations are omitted. FIG. 5 does not illustrate the constant current circuit 200 that is connected to the cathode side of each of the white LED arrays 100a, 100b, ..., 100n.

When the white LED is driven, an input voltage is boosted and applied to the white LED so that it is possible to increase the number of white LEDs connected in series, i.e., the total number of white LEDs driven. In the example illustrated in FIG. 5, a booster circuit is added to the configuration that is described above with reference to FIG. 2. The booster circuit includes a coil L1, a transistor Q2, a zener diode ZD1, and a capacitor C10. In the booster circuit, the accumulation and release of energy in and from the coil L1 are repeated by using a booster clock that is input to the gate of the transistor Q2, and a high voltage is output to the cathode side of the zener diode ZD1. It is preferable to select a sufficiently higher frequency of the booster clock than the frequency of the PWM signal for driving the white LED arrays 100a, 100b, ..., 100n.

With the configuration illustrated in FIG. 5, an input voltage is boosted by the booster circuit and the boosted voltage is applied to each of the white LED arrays 100a, 100b, ..., 100n. Furthermore, capacitors C2a, C2b, ..., C2n are connected to the white LED arrays 100a, 100b, ..., 100n, respectively, in parallel so that high-frequency components of the drive current are rejected for the white LED arrays 100a, 100b, ..., 100n.

In the same manner as the above-described first embodiment, with the configuration according to the first modified example of the first embodiment, the capacitor is connected to the white LED in parallel so that it is possible to obtain a longer rise transition time and a longer fall transition time of the drive current in the white LED. Thus, in the white LED, the response time of the blue LED during the lighting-down becomes closer to the response time of the yellow fluorescent material during the lighting-down due to its response characteristics, whereby it is possible to reduce residual emission of the yellow fluorescent material during the lighting-down.

In the first modified example of the first embodiment, it is also preferable to select the capacitance of each of the capacitors C2a, C2b, ..., C2n so that the rise transition time and the fall transition time of the current flowing through the white LED arrays 100a, 100b, ..., 100n become close to the time constants of the response characteristics of the yellow fluorescent material during the lighting-up and the lighting-down, whereby it is possible to effectively prevent a change in the chromaticity of the white LED.

Second Modified Example of First Embodiment

Figure 6:
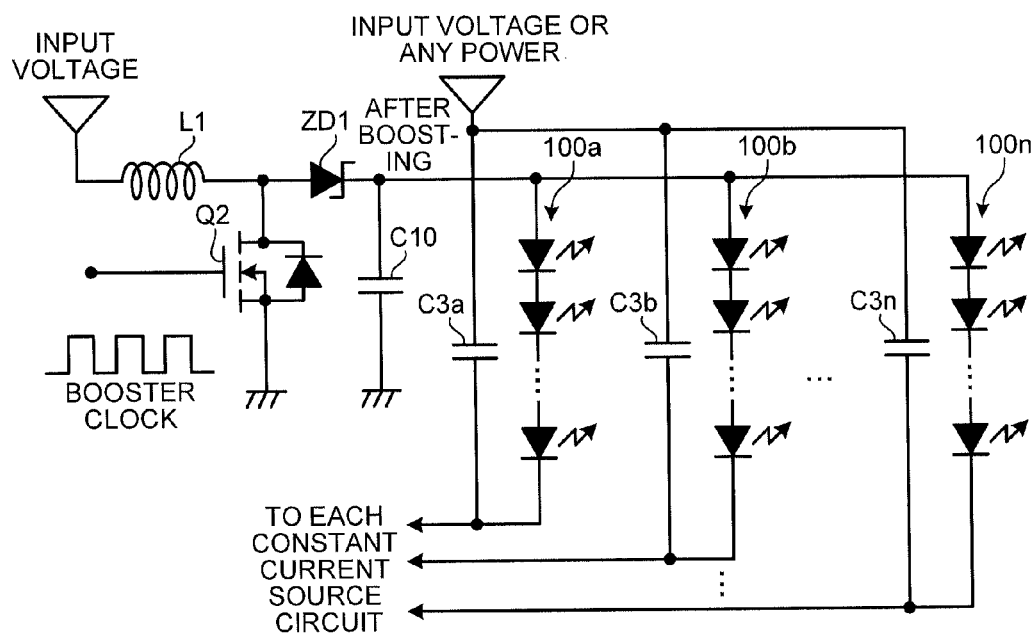
FIG. 6 is a circuit diagram that illustrates an exemplary drive circuit of a white LED according to a second modified example of the first embodiment of the present invention.

FIG. 6 illustrates an exemplary configuration of a drive circuit of a white LED according to a second modified example of the above-described first embodiment. The second modified example is obtained by further modifying the first modified example of the first embodiment, which has been explained with reference to FIG. 5. In FIG. 6, the same components as those described in FIG. 5 are denoted by the same reference marks, and their detailed explanations are omitted. FIG. 6 does not illustrate the constant current circuit 200 that is connected to the cathode side of each of the white LED arrays 100a, 100b, ..., 100n.

In the second modified example, when an input voltage is boosted and the boosted voltage is applied to each of the white LED arrays 100a, 100b, ..., 100n, an unboosted input voltage or any power is applied to capacitors C3a, C3b, ..., C3n that each have one end connected to the cathode side of the white LED arrays 100a, 100b, ..., 100n.

As described above, even if the capacitors C3a, C3b, ..., C3n are not connected to the white LED arrays 100a, 100b, ..., 100n, respectively, in parallel, it is possible to obtain a longer rise transition time and a longer fall transition time of the drive current in the white LED.

The constant current circuit 200, which is connected to the cathode side of each of the white LED arrays 100a, 100b, ..., 100n, draws a current such that the current flowing into the drain of the transistor Q1, i.e., the resistive element R1, has a rectangular wave. Therefore, high-frequency components flow into each of the capacitors C3a, C3b, ..., C3n, so that the current behaves such that the current sharply rises from the edge of the rectangular wave and then attenuates, as illustrated in FIG. 4A.

Conversely, the current flowing into, for example, the white LED array 100a includes components (low-frequency components) other than the high-frequency components of the rectangular wave flowing into the capacitor C3a. Therefore, as illustrated in FIG. 4B, the current flowing through each of the white LED arrays 100a, 100b, ..., 100n behaves such that the rise transition time and the fall transition time are much longer than those of the rectangular wave, i.e., gradual rising and falling characteristics.

In the second modified example of the first embodiment, it is also preferable to select the capacitance of each of the capacitors C3a, C3b, ..., C3n such that the rise transition time and the fall transition time of the current flowing through the white LED arrays 100a, 100b, ..., 100n become close to the time constants of the response characteristics of the yellow fluorescent material during the lighting-up and the lighting-down, whereby it is possible to effectively prevent a change in the chromaticity of the white LED.

In the same manner as the above-described modified example of the first embodiment, with the configuration according to the second modified example of the first embodiment, it is possible to obtain a longer rise transition time and a longer fall transition time of the drive current in the white LED. In the white LED, the response time of the blue LED during the lighting-down becomes closer to the response time of the yellow fluorescent material during the lighting-down due to its response characteristics, whereby it is possible to reduce residual emission of the yellow fluorescent material during the lighting-down.

The voltage boosting performed by the booster circuit always causes a booster loss (conversion loss). Therefore, in the same manner as in the second modified example of the first embodiment, a current is drawn for which a booster loss has not occurred or a current is drawn from a power source that has nothing to do with any booster loss, whereby the current can be controlled with less waste.

Second Embodiment

Figure 7:
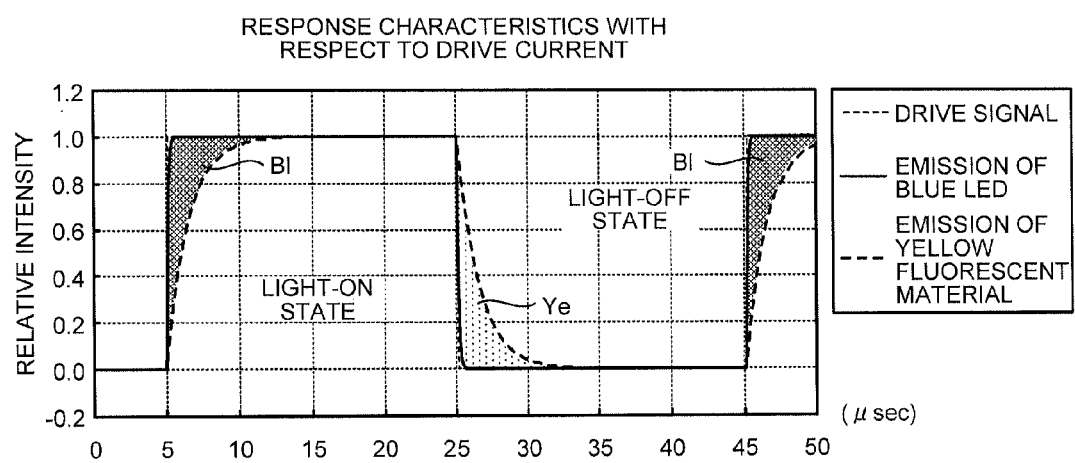
FIG. 7 is a graph that illustrates an example of the response characteristics of a white LED with respect to the drive current according to a second embodiment of the present invention.

Next, an explanation is given of a second embodiment of the present invention. FIG. 7 illustrates an example of the response characteristics of a white LED with respect to the drive current according to the second embodiment. As illustrated in FIG. 7, according to the second embodiment, a control is performed such that the drive current in the white LED has sharp rising and falling characteristics and the rise transition time nearly equals the fall transition time. More specifically, a control is performed such that the rise transition time and the fall transition time fall within a predetermined range and the drive current in the white LED is substantially a rectangular wave.

A control is performed so that the drive current is substantially a rectangular wave. Thus, on the rising side of the drive current, the blue LED enters the light-emitting state before the yellow fluorescent material does, and excessive blue emission occurs, in which the emission intensity of the blue LED is higher than that of the yellow fluorescent material (the area B1). Therefore, on the rising side of the drive current, the color of emitted light is bluish due to the blue LED. Conversely, on the falling side of the drive current, the blue LED enters the non light-emitting state before the yellow fluorescent material does, and the color of emitted light is yellowish due to the residual emission of the yellow fluorescent material (the area Ye). Thus, in terms of one cycle of the drive current, it is possible to obtain pseudo white light because the excessive emission of the blue LED and the residual emission of the yellow fluorescent material offset each other.

Figure 8:
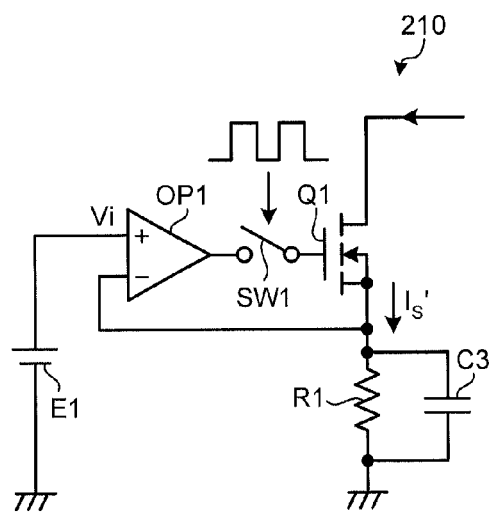
FIG. 8 is a circuit diagram that illustrates an exemplary constant current circuit according to the second embodiment of the present invention.
Figure 9:
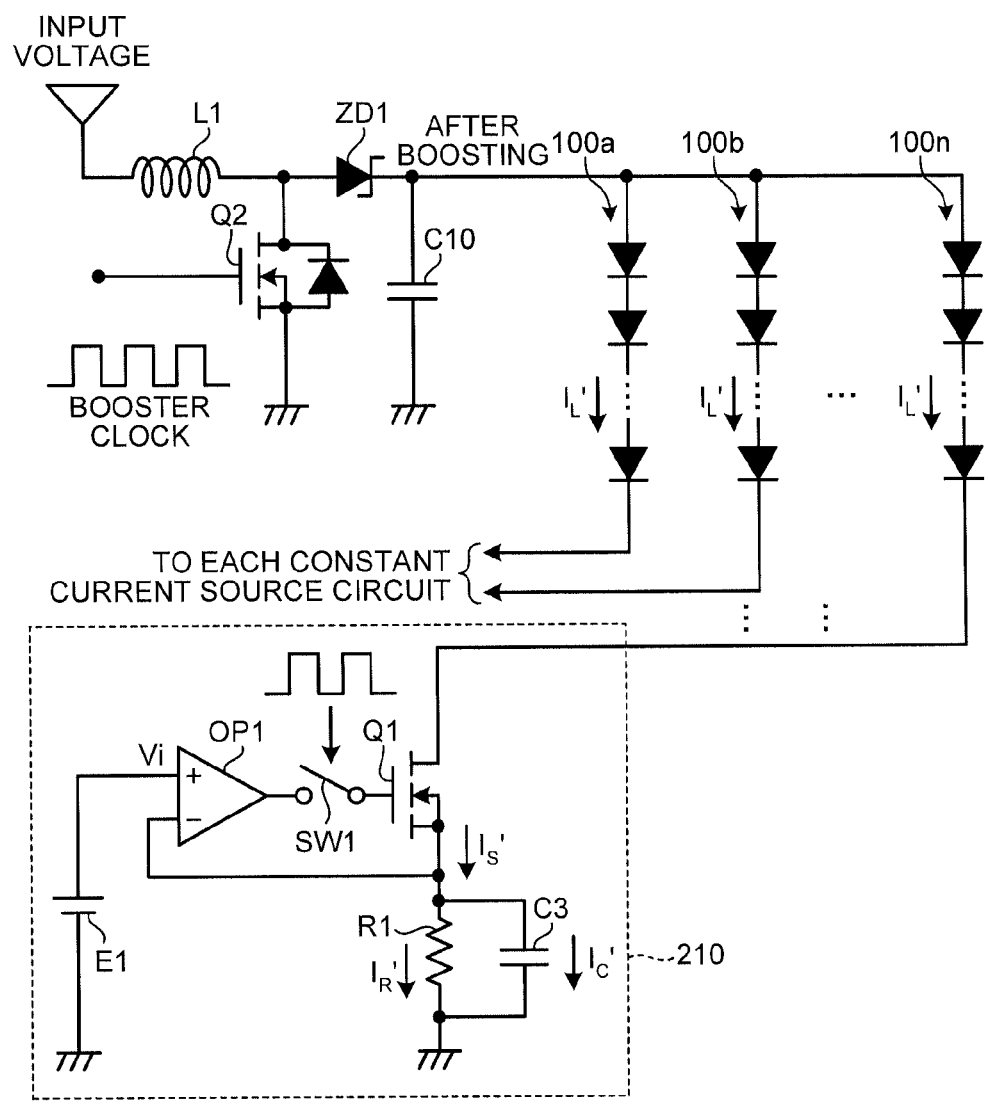
FIG. 9 is a circuit diagram that illustrates an exemplary white-LED drive circuit that uses the constant current circuit according to the second embodiment of the present invention.

Next, with reference to FIGS. 8 and 9, a detailed explanation is given of a configuration for controlling the drive current, as illustrated in FIG. 7. According to the second embodiment, a capacitor such as a condenser is added to the side of the constant current circuit so that a substantially square-wave drive current is generated, as illustrated in FIG. 7. FIG. 8 illustrates an exemplary configuration of a constant current circuit 210 according to the second embodiment. In FIG. 8, the same components as those of the constant current circuit 200 described in FIG. 3 are denoted by the same reference marks, and their detailed explanations are omitted.

The constant current circuit 210 illustrated in FIG. 8 is obtained by adding a capacitor C3 to the constant current circuit 200 illustrated in FIG. 3. The capacitor C3 is connected to the resistive element R1, which is a load resistor, in parallel. In the same manner as the above-described constant current circuit 200, in the constant current circuit 210, if the reference voltage E1 is the voltage "$V_i$", the resistive element R1 has the resistance value R, and the current $I_S'$ is output from the source of the transistor Q1, then $V_i = R \times I_S'$. If the reference voltage E1 and the resistance value of the resistive element R1 are fixed, the constant current circuit 210 operates such that the current $I_S'$ output from the source of the transistor Q1 is constant.

When the switch circuit SW1, which controls the gate input of the transistor Q1, is turned on/off for the PWM drive, high-frequency components, which are sharply changing components, in the source current $I_S'$ output from the source of the transistor Q1 flow into the lower-impedance capacitor C3; therefore, the source current $I_S'$ is less likely to be subjected to the current limitation by the load resistor (the resistive element R1). Thus, the current $I_S'$ output from the source of the transistor Q1, i.e., the current drawn by the drain of the transistor Q1, has sharp rising and falling characteristics.

Therefore, if the constant current circuit 210 is used in the drive circuit for the white LED arrays, as illustrated in FIG. 9, the white LEDs can be driven by using the current that has sharp rising and falling characteristics, as illustrated in FIG. 7. Thus, it is possible to obtain pseudo white light because the excessive emission of the blue LED and the residual emission of the yellow fluorescent material offset each other during one cycle of lighting-up.

FIG. 9 illustrates an exemplary configuration of a white-LED drive circuit that uses the constant current circuit 210 according to the second embodiment. In FIG. 9, the same components as those described above in FIGS. 5 and 8 are denoted by the same reference marks, and their detailed explanations are omitted. In the example of FIG. 9, an input voltage is boosted by the booster circuit that includes the coil L1, the transistor Q2, the zener diode ZD1, and the capacitor C10, and the boosted voltage is applied to the anode side of each of the white LED arrays 100a, 100b, . . . , 100n. The constant current circuit 210 is individually connected to the cathode side of each of the white LED arrays 100a, 100b, . . . , 100n.

Figure 10A:
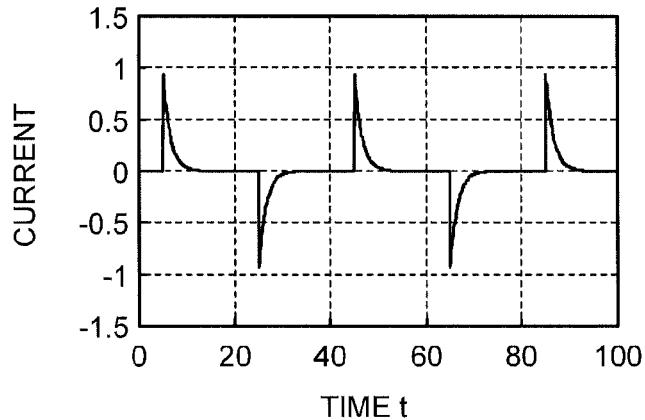
FIG. 10A is a graph that illustrates an example of the behavior of the current in the drive circuit of the white LED according to the second embodiment of the present invention.
Figure 10B:
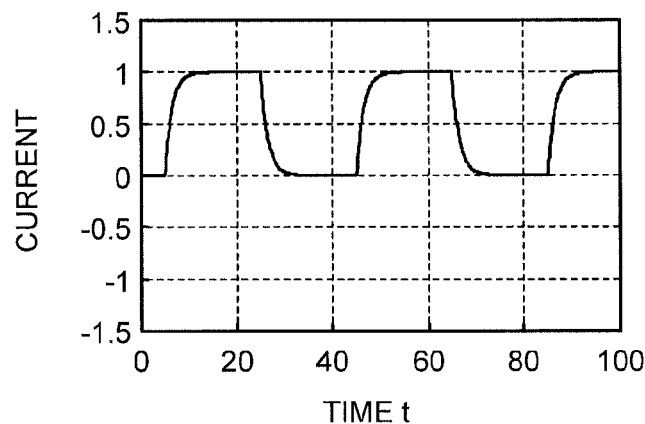
FIG. 10B is a graph that illustrates an example of the behavior of the current in the drive circuit of the white LED according to the second embodiment of the present invention.
Figure 10C:
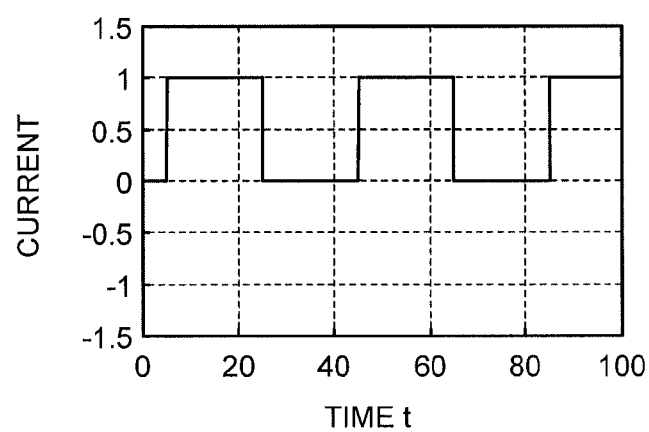
FIG. 10C is a graph that illustrates an example of the behavior of the current in the drive circuit of the white LED according to the second embodiment of the present invention.

With reference to FIGS. 10A to 10C, an explanation is given of the behavior of the current in each unit illustrated in FIG. 9 when the switch circuit SW1 is turned on/off with a duty ratio of 1:1. FIG. 10A illustrates an example of the behavior of the current $I_C'$ in the capacitor C3, which is connected to the resistive element R1 in parallel. As described above, in the constant current circuit 210, the current $I_S$ output from the source of the transistor Q1 has a rectangular wave. The high-frequency components of the rectangular wave flow into the capacitor C3. Therefore, the current $I_C'$ in the capacitor C3 behaves such that the current $I_C'$ sharply rises from the edge of the rectangular wave and then attenuates (in the rising portion of the current $I_C'$), as illustrated in FIG. 10A.

FIG. 10B illustrates an example of the behavior of the current $I_R'$ in the constant current load, i.e., the resistive element R1. The current $I_R'$ flows into the resistive element R1 and the current $I_R'$ has components (i.e., the current has low-frequency components) that are included in the square-wave current $I_S'$ output from the source of the transistor Q1 and that are other than the current $I_C'$ flowing through the capacitor C3. Therefore, as illustrated in FIG. 10B, the current $I_R'$ behaves such that the rise transition time and the fall transition time are much longer than those of the rectangular wave, i.e., gradual rising and falling characteristics.

FIG. 10C illustrates an example of the behavior of the current of each white LED in the white LED array 100n. The current $I_L'$ flowing through the white LED is the current drawn by the drain of the transistor Q1 and is nearly equal to the current $I_S'$ output from the source of the transistor Q1. The source of the transistor Q1 is connected to the resistive element R1 and the capacitor C3 so that the current $I_C'$ that has the high-frequency components of the rectangular wave flows into the capacitor C3 and the current $I_R'$ that has the other components (low-frequency components) flows into the resistive element R1. As the current $I_S'$ is the sum of the current $I_R'$ flowing through the resistive element R1 and the current $I_C'$ flowing through the capacitor C3, the current $I_S'$ has a substantially rectangular wave; therefore, the current $I_L'$ flowing through each white LED behaves as a rectangular wave.

As described above, a capacitor is connected to a load resistor in parallel in the constant current circuit 210 so that the drive current in the white LED sharply rises and falls. Thus, the excess emissions generated when the drive current of the white LED rises and falls, i.e., a change in the color due to the excessive emission of the blue LED and a change in the color due to the residual emission of the yellow fluorescent material offset each other during one cycle of emission. Thus, it is possible to reduce a change in the chromaticity in relation to a change in the duty ratio and the frequency of the drive current.

The capacitance of the capacitor C3 is selected such that the time constants (transition times) for the rising and falling of the drive current are nearly the same as each other, whereby it is possible to generate a drive current by which the chromaticity is less changed in relation to a change in the duty ratio and the frequency of the drive current.

The constant current circuit 210 is used in the white-LED drive circuit that includes the booster circuit, as illustrated in FIG. 9; however, this example is not a limitation. Specifically, the constant current circuit 210 may be used in a white-LED drive circuit that does not include a booster circuit, as illustrated in FIG. 2. In such a case, it is obvious that the capacitors C1a, C1b, . . . , C1n illustrated in FIG. 2 are not used.

Third Embodiment

Next, an explanation is given of a third embodiment of the present invention. In the third embodiment, the light-source control device according to the present invention is used in a light source of a scanner device in which light is emitted by the light source, the emitted light is reflected by a document, the reflected light is received by a light-receiving element, and the received light is converted into an electric signal so that an image of the document is read.

Figure 11:
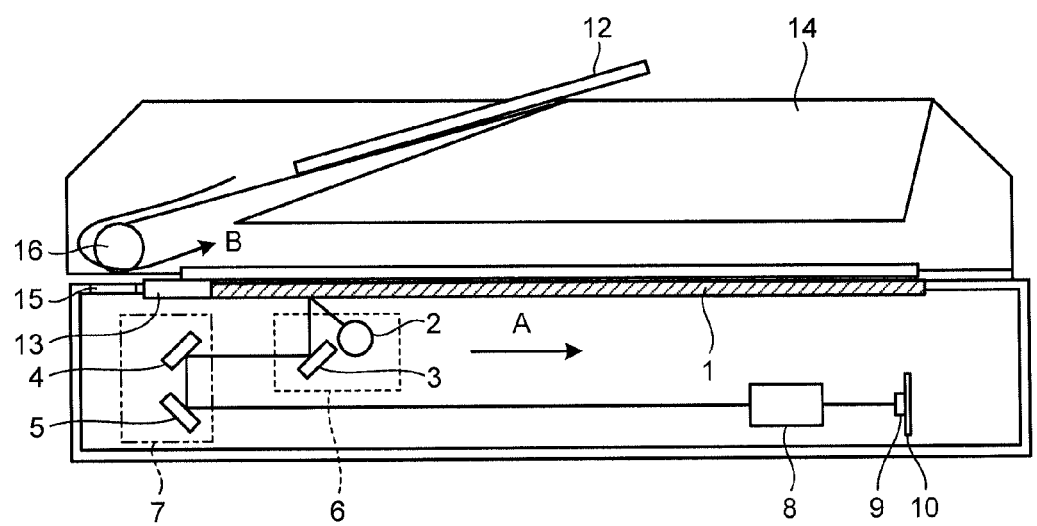
FIG. 11 is a schematic diagram that schematically illustrates an exemplary configuration of a scanner device to which a third embodiment of the present invention can be applied.

FIG. 11 schematically illustrates an exemplary configuration of a scanner device to which the third embodiment of the present invention can be applied. As illustrated in FIG. 11, the scanner device includes a contact glass 1 on which a document is placed; a first carriage 6 that includes a light source 2 for exposure to a document and a first reflection mirror 3; a second carriage 7 that includes a second reflection mirror 4 and a third reflection mirror 5; an image sensor 9 that is, for example, a charge coupled device (CCD) or complementary metal-oxide semiconductor (CMOS) image sensor; a lens unit 8 that forms an image on the image sensor 9; and a white reference plate 13 that is used for correcting various types of distortion caused by an optical reading system, or the like. The image sensor 9 is mounted on a sensor board unit 10.

The light source 2 emits light that is generated by driving the above-described white LED arrays 100a, 100b, . . . , 100n with PWM. The light source 2 is formed by, for example, arranging the white LED arrays 100a, 100b, . . . , 100n in one or more rows in the main scanning direction. A predetermined number of white LEDs are arrayed in each of the white LED arrays 100a, 100b, . . . , 100n. The image sensor 9 is configured so that, for example, CCD linear image sensors are arranged in the main scanning direction.

During scanning in a book reading mode, the first carriage 6 and the second carriage 7 are moved by a stepping motor (not illustrated in the drawing) in the sub-scanning direction indicated by the arrow A. The document placed on the contact glass 1 is irradiated with the light emitted by the light source 2, and the reflected light enters the lens unit 8 via the first reflection mirror 3, the second reflection mirror 4, and the third reflection mirror 5 so that the light is focused on the image sensor 9. The image sensor 9 converts the focused light into an electric signal and outputs the converted signal.

Conversely, in a sheet-through mode (an automatic document reading mode), the first carriage 6 and the second carriage 7 are moved under a slit 15 for sheet-through reading, and then a document 12 placed on an automatic document feeder 14 is guided by a roller 16 in the direction indicated by the arrow B, whereby the document is read at the position of the slit 15 for sheet-through reading.

The positions of the first carriage 6 and the second carriage 7 are controlled so that light emitted by the light source 2 is reflected by the white reference plate 13 and the light is focused on the image sensor 9 via the first reflection mirror 3, the second reflection mirror 4, the third reflection mirror 5, and the lens unit 8. Thus, calibration can be performed by using the color white as a reference.

Figure 12:
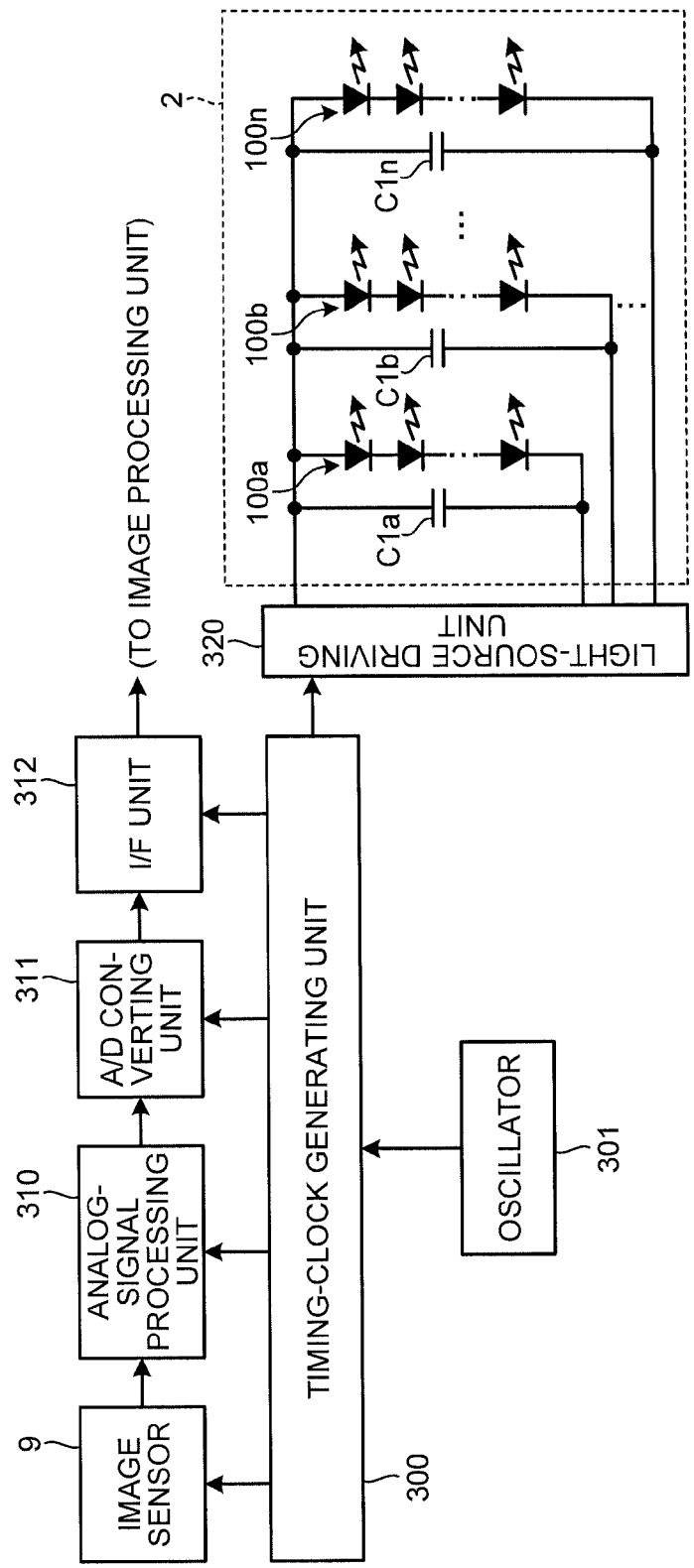
FIG. 12 is a block diagram that illustrates an exemplary configuration of the scanner device to which the third embodiment of the present invention can be applied.

FIG. 12 illustrates an exemplary configuration for signal processing performed by the scanner device illustrated in FIG. 11. In FIG. 12, the same components as those described in FIG. 2, 11, or the like, are denoted by the same reference marks, and their detailed explanations are omitted. The scanner device includes the image sensor 9, a timing-clock generating unit 300, an oscillator 301, an analog-signal processing unit 310, an A/D converting unit 311, an interface (I/F) unit 312, a light-source driving unit 320, and the light source 2.

The image sensor 9 performs photoelectric conversion to convert the received light into an analog signal and outputs the converted signal. The analog signal output from the image sensor 9 is fed to the analog-signal processing unit 310 so as to be subjected to a predetermined process, such as sample and hold processing or black level correction, and is then output. The output from the analog-signal processing unit 310 is converted into a digital signal by the A/D converting unit 311 so as to be obtained as analog image data and is then fed to an image processing unit (not illustrated in the drawing) via the I/F unit 312.

The timing-clock generating unit 300 generates a timing signal to be fed to each unit of the scanner device in accordance with the reference signal fed from the oscillator 301, which uses, for example, a crystal oscillator. For example, the timing-clock generating unit 300 generates a clock signal to be used in the image sensor 9, the analog-signal processing unit 310, the A/D converting unit 311, the I/F unit 312, the light-source driving unit 320, and a stepping motor (not illustrated in the drawing) and then feeds the signal to each unit. The timing-clock generating unit 300 also generates a drive signal for controlling the switch circuit SW1 so that it is turned on/off in the constant current circuit 200 or the constant current circuit 210 and generates a drive signal for driving the light source 2.

The light-source driving unit 320 includes the constant current circuit 200 or the constant current circuit 210. The light-source driving unit 320 may further include a booster circuit that boosts an input voltage for driving the white LED arrays 100a, 100b, . . . , 100n. A method of driving the white LED arrays 100a, 100b, . . . , 100n may be any method according to the above-described first embodiment, the first and second modified examples of the first embodiment, or the second embodiment. In the example of FIG. 12, the capacitors C1a, C1b, . . . , C1n are connected to the white LED arrays 100a, 100b, . . . , 100n, respectively, in parallel, i.e., the first embodiment or the first modified example of the first embodiment is applied to this example. The light-source driving unit 320 includes the constant current circuit 200.

With this configuration, the timing-clock generating unit 300 generates a drive signal for driving the switch circuit SW1 in the constant current circuit 200 or 210 in synchronization with the scanning timing of the image sensor 9 in the main scanning direction or an analog signal output from the image sensor 9. For example, a drive signal is generated such that one cycle or an integral multiple of the cycle of lighting-up and lighting-down of the white LED arrays 100a, 100b, . . . , 100n matches the timing of one scan in the main scanning direction. Thus, it is possible to prevent the effect on a read image of a change in the chromaticity, variation in the light intensity, a change in the light intensity, or the like, due to residual emission of the yellow fluorescent material, excessive emission of the blue LED, or the like, in the white LED.

Figure 13A:
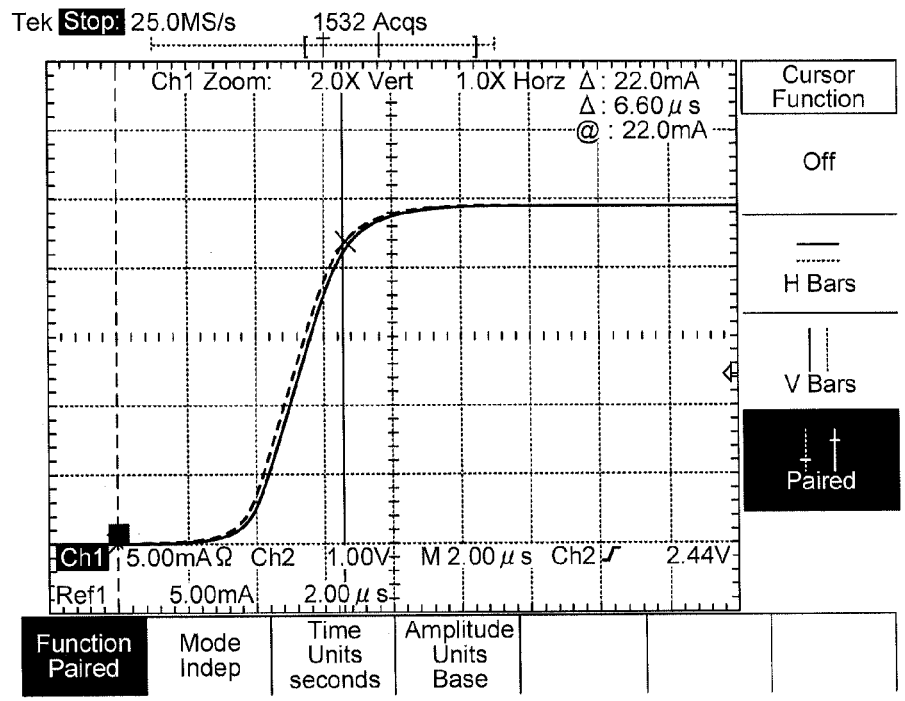
FIGS. 13A and 13B are graphs that illustrate an example of the actual measurement of the behavior of the current flowing through the white LED when the present invention is not applied.

With reference to FIGS. 13A to 16B, an explanation is given of the effect obtained when the configuration illustrated in FIG. 2 or FIG. 3 is used in the scanner device according to the third embodiment. FIGS. 13A and 13B illustrate an example of the actual measurement of the behavior of the current flowing through the white LED arrays 100a, 100b, . . . , 100n when the present invention is not applied, i.e., when the capacitors C1a, C1b, . . . , C1n are not connected to the white LED arrays 100a, 100b, . . . , 100n, respectively, in parallel.

Figure 13B:
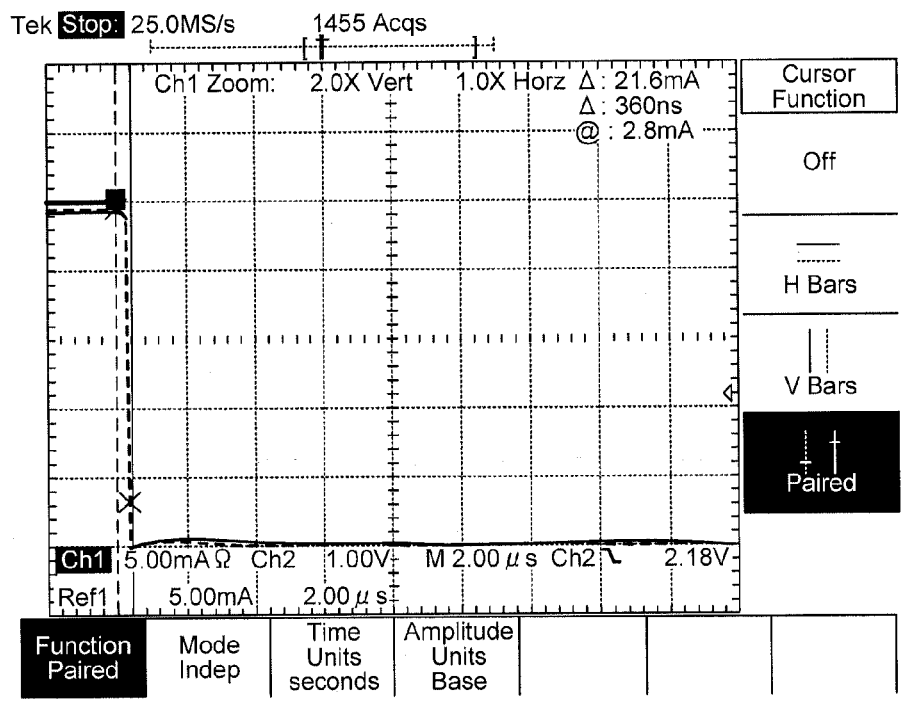

FIGS. 13A and 13B illustrate an example of the actual measurement obtained when the drive current rises and falls. When the drive current rises, the current changes in a smooth manner because of the effect of the current-limiting load of the resistive element R1 in the constant current circuit 200. When the drive current falls, the current is cut off by the transistor Q1 so that the current changes sharply. In this condition, when the drive current falls, i.e., during the lighting-down, a color is produced due to the residual emission of the yellow fluorescent material.

Figure 14:
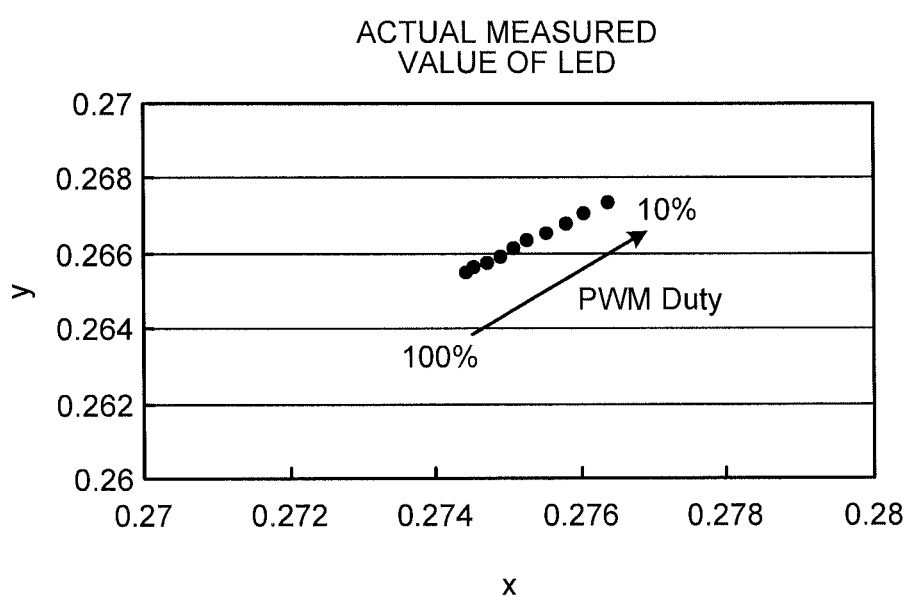
FIG. 14 is a graph that illustrates an example of the actual measurement of a change in the chromaticity when the present invention is not applied.

FIG. 14 illustrates an example of the actual measurement of a change in the chromaticity of the surface of a document placed on the contact glass 1 when the present invention is not applied and when the duty ratio of the drive current is changed in the range between 100% and 10%. In the example of FIG. 14, with respect to a change in the duty ratio in the range between 100% and 10%, a change of about 0.002 in the chromaticity is recognizable in the x direction and the y direction.

Figure 15A:
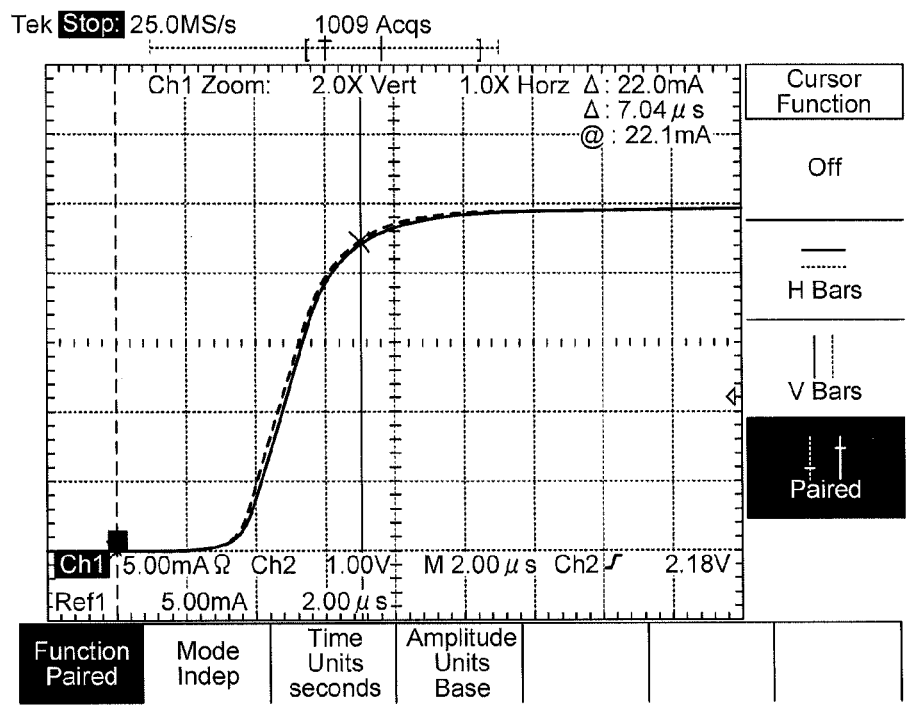
FIGS. 15A and 15B are graphs that illustrate an example of the actual measurement of the behavior of the current flowing through the white LED when the present invention is applied.
Figure 15B:
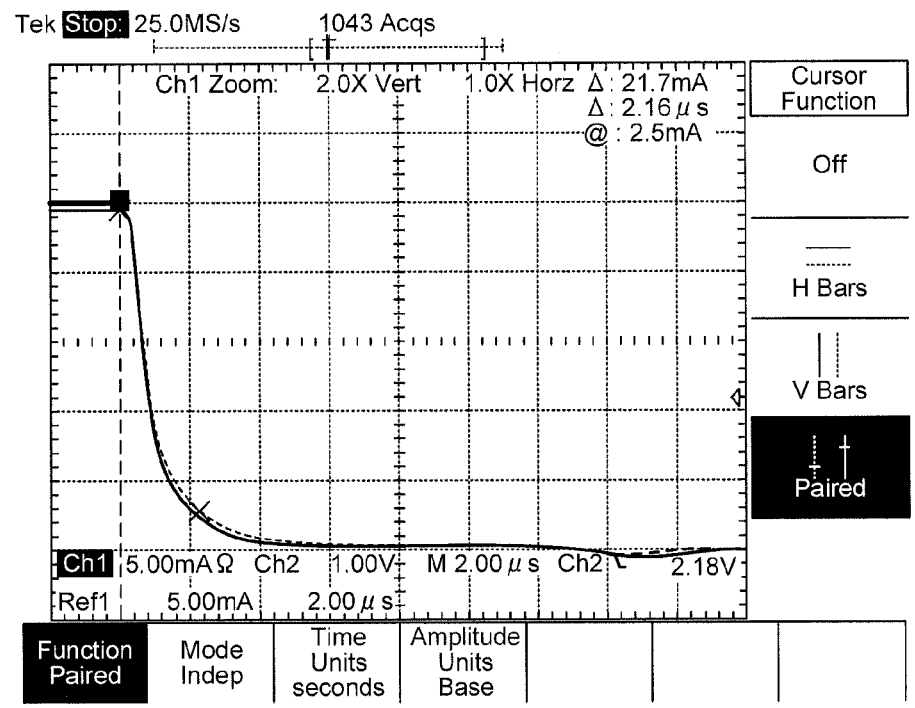

FIGS. 15A and 15B illustrate an example of the actual measurement of the behavior of the current when the present invention is applied, for example, when the capacitors C1a, C1b, ..., C1n are connected to the white LED arrays 100a, 100b, ..., 100n, respectively, in parallel. FIGS. 15A and 15B illustrate an example of the actual measurement obtained when the drive current rises and falls. When the drive current rises, the current changes in a smooth manner because of the effect of the current-limiting load of the resistive element R1 in the constant current circuit 200 in the same manner as that in FIG. 13A. Conversely, when the drive current falls, the high-frequency components flow into the capacitors C1a, C1b, ..., C1n that are connected to the white LED arrays 100a, 100b, ..., 100n, respectively, due to the change in the current, whereby the current changes in a smooth manner.

Figure 16A:
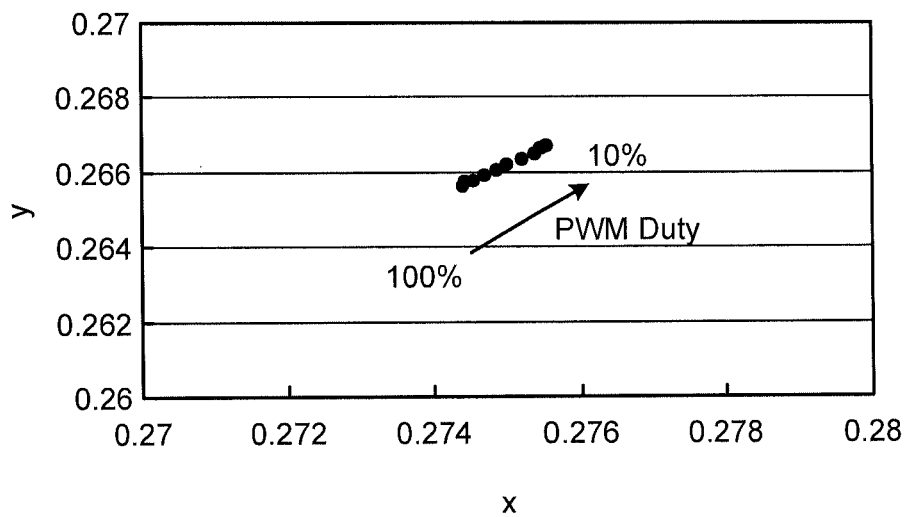
FIGS. 16A and 16B are graphs that illustrate an example of the actual measurement of a change in the chromaticity when the present invention is applied.
Figure 16B:
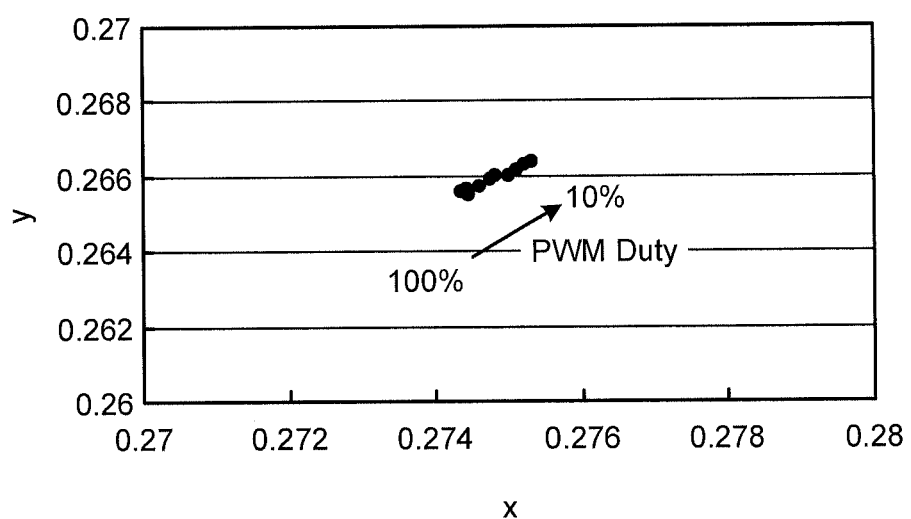

FIGS. 16A and 16B illustrate an example of the actual measurement of a change in the chromaticity of the surface of a document placed on the contact glass 1 when the present invention is applied and when the duty ratio of the drive current is changed in the range between 100% and 10%. In the example of FIGS. 16A and 16B, with respect to a change in the duty ratio in the range between 100% and 10%, a change of about 0.0013 in the chromaticity is recognizable in the x direction and a change of about 0.0011 in the chromaticity is recognizable in the y direction. Compared to a case where the present invention is not applied as illustrated in FIG. 14, it is recognized that the change in the chromaticity is smaller.

FIG. 16B illustrates an example where the capacitance of each of the capacitors C1a, C1b, ..., C1n is optimized and the time constant of the capacitor C1a, C1b, ..., C1n becomes closer to the time constant of the residual emission of the yellow fluorescent material. This example shows that, with respect to a change in the duty ratio in the range between 100% and 10%, a change of about 0.0095 in the chromaticity is recognizable in the x direction and a change of about 0.0009 in the chromaticity is recognizable in the y direction. The capacitance of each of the capacitors C1a, C1b, ..., C1n is optimized so that a change in the chromaticity can be further reduced.

Fourth Embodiment

Figure 17:
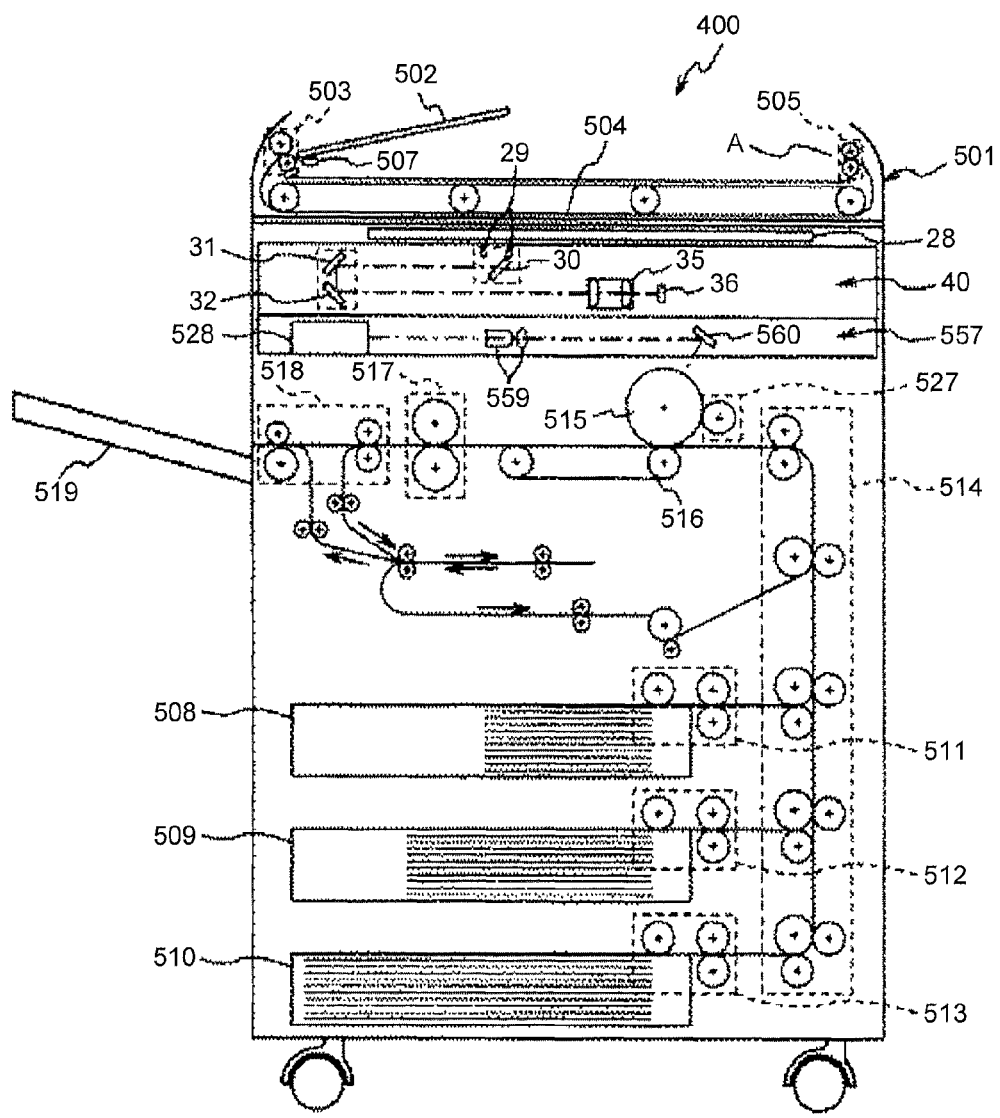
FIG. 17 is a schematic diagram that illustrates an exemplary configuration of a copier that can be used in a fourth embodiment of the present invention.
Figure 18A:
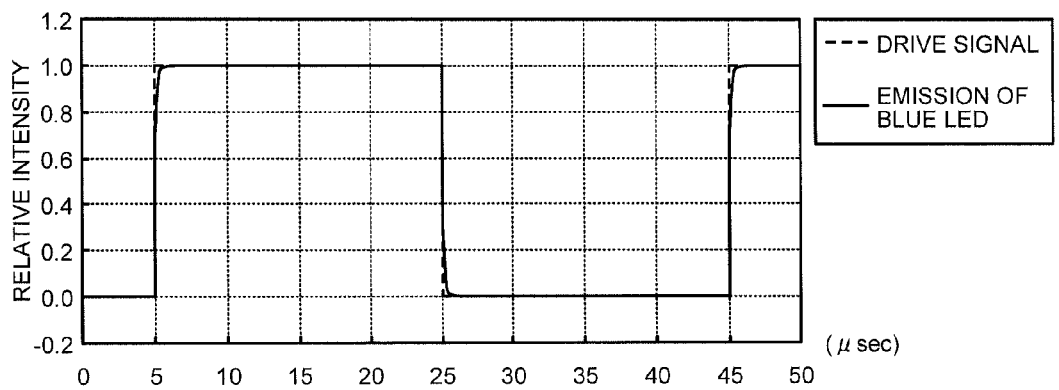
FIGS. 18A and 18B are graphs that illustrate the emission response characteristics of a white LED with respect to the drive current.
Figure 18B:
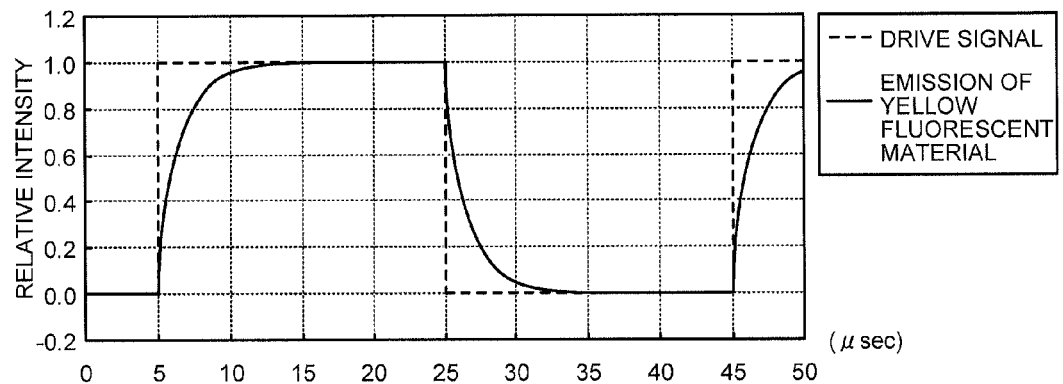
Figure 19:
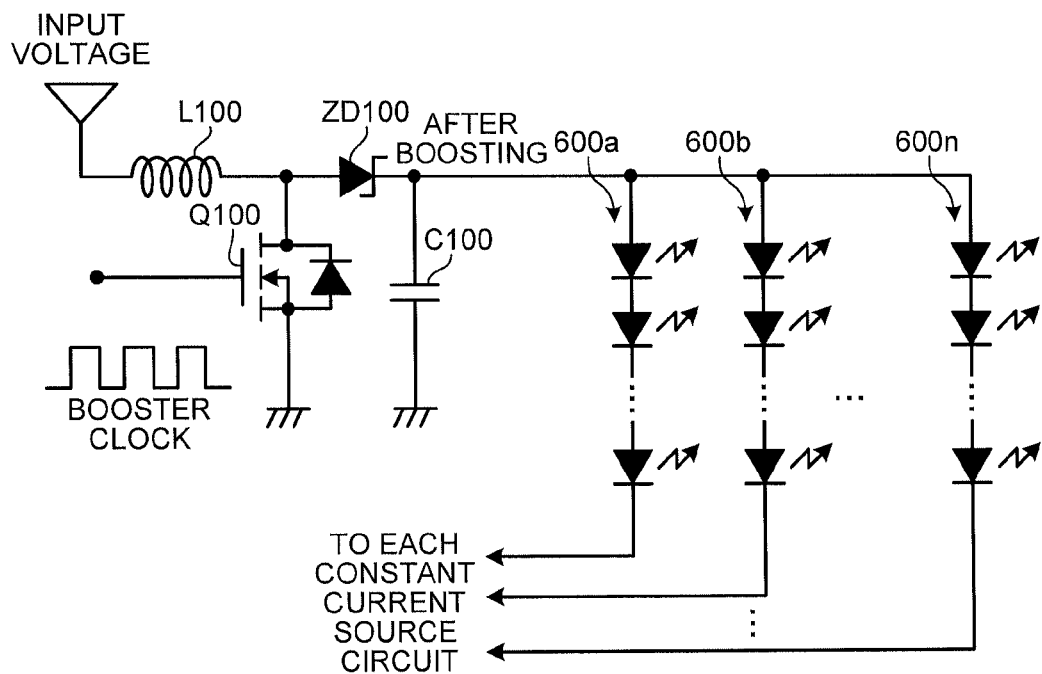
FIG. 19 is a circuit diagram that illustrates an exemplary configuration of a circuit for driving an LED that is the light source of a scanner device.

Next, an explanation is given of a fourth embodiment of the present invention. In the fourth embodiment, the light-source control device according to the present invention is used in a copier in which an image of a document is read by a scanner unit and an image is formed on a sheet by using obtained image data. FIG. 17 illustrates an exemplary configuration of a copier 400 that can be used in the fourth embodiment.

As illustrated in FIG. 17, a contact glass 28 is mounted on the top of the copier 400. An automatic document feeder (ADF) 501 is installed in the upper section of the copier 400. The ADF 501 is coupled to the copier 400 with a hinge (not illustrated), or the like, so that the contact glass 28 is covered and uncovered. The ADF 501 includes a document tray 502 that is a document placement board on which a stack of documents can be placed; and a separating/conveying unit that separates the documents in the stack placed on the document tray 502 one by one and conveys the document toward the contact glass 28.

The separating/conveying unit conveys and stops the document, which is conveyed toward the contact glass 28, at the reading position on the contact glass 28. The separating/conveying unit also conveys the document, for which reading has been completed by a scanner unit 40 arranged under the contact glass 28, from the contact glass 28.

In the example of FIG. 17, the scanner unit 40 includes a light source 29, mirrors 30, 31, 32, a lens unit 35, and an image sensor 36. The light emitted by the light source 29 enters the lens unit 35 via the mirrors 30, 31, and 32. The lens unit 35 focuses the incoming light on the image sensor 36.

In the scanner unit 40, a CCD or CMOS image sensor may be used for the image sensor 36. According to the fourth embodiment, the light source 29 includes a white LED array as a light emission source. For example, the configuration of the scanner unit 40 may correspond to the configuration of the scanner device that is explained above with reference to FIGS. 11 and 12 according to the third embodiment, and the light source 29 may have the same configuration as that of the light source 2 illustrated in FIGS. 11 and 12.

The light source 29 is driven for emission by a light-source driving unit (not illustrated) that is the same as the light-source driving unit 320 illustrated in FIG. 12. A method of driving a white LED array may be any method according to the above-described first embodiment, the first and second modified examples of the first embodiment, or the second embodiment. The lighting-up cycle of the light source 29 is controlled such that one cycle or an integral multiple of the cycle matches the timing of the scanning cycle of the image sensor 36. Thus, it is possible to prevent the effect on a read image of a change in the chromaticity, variation in the light intensity, a change in the light intensity, or the like, due to the residual emission of the yellow fluorescent material, excessive emission of the blue LED, or the like, in the white LED.

A controller (not illustrated) drives and rotates a sheet-feeding motor (not illustrated) in a normal direction and the opposite direction in accordance with a sheet-feeding start signal from the copier 400. When the sheet-feeding motor is rotated in the normal direction, a feed roller 503 is rotated in a clockwise direction so that a document placed on the top of the stack of documents is fed and conveyed toward the contact glass 28. When a document-set detection sensor 507 detects the leading edge of the document, the controller rotates the sheet-feeding motor in the opposite direction in accordance with an output signal received from the document-set detection sensor 507. Thus, a subsequent document is prevented from being conveyed, and the documents are separated from each other.

Furthermore, when the document-set detection sensor 507 detects the trailing edge of the document, the controller starts to count the rotation pulses for a conveying-belt motor from the time of detection. When the number of rotation pulses reaches a predetermined number, the controller stops driving a feed belt 504 so that the feed belt 504 is stopped, whereby the document is stopped at the reading position on the contact glass 28. When the document-set detection sensor 507 detects the trailing edge of the document, the controller drives the sheet-feeding motor again so that the subsequent document is separated and conveyed toward the contact glass 28, as described above. When the number of pulses of the sheet-feeding motor reaches a predetermined number of pulses after the document-set detection sensor 507 detects the document, the controller stops the sheet-feeding motor so that the subsequent document is fed first and enters a stand-by state.

When the document is stopped at the reading position on the contact glass 28, the image sensor 36 of the scanner unit 40 in the copier 400 reads light that is emitted by the light source 29 and reflected by the document, whereby the document is read. When the reading is finished, a signal that indicates that the reading is finished is input to the controller. When the signal is input, the controller rotates the sheet-feeding motor in the normal direction so that the document is conveyed by the feed belt 504 from the contact glass 28 to a discharge roller 505.

As described above, when a print key of an operation unit is pressed, the stack of documents placed on the document tray 502 of the ADF 501 is fed to a predetermined position on the contact glass 28, starting with the document on the top of the stack. Each of the placed documents has its image surface facing upward. The fed document is read by the scanner unit 40 through the contact glass 28 and then discharged into a discharge outlet A (a discharge outlet that is used when a document is reversed and discharged) by the feed belt 504 and a reverse drive roller. If it is detected that there is a subsequent document on the document tray 502, the subsequent document is fed to the contact glass 28 in the same manner as the previous document.

Transfer sheets stacked on a first tray 508, a second tray 509, and a third tray 510 are fed by a first sheet-feeding unit 511, a second sheet-feeding unit 512, and a third sheet-feeding unit 513, respectively, and then conveyed by a longitudinal conveying unit 514 to a position where the transfer sheet is brought into contact with a photosensitive element 515. Image data obtained by reading the image of the document using the scanner unit 40 is written in the photosensitive element 515 by using a laser of a writing unit 557, and a toner image is formed after the written image passes through a developing unit 527.

The writing unit 557 includes a laser light source 528 and a lens unit 559. The writing unit 557 also includes a mirror unit 560 that includes, for example, a polygon mirror. The rotating mirror unit 560 is irradiated with the laser light emitted from the laser light source 528 via the lens unit 559. Due to the rotation of the mirror unit 560, the photosensitive element 515 is scanned in the main scanning direction by using the laser light with which the mirror unit 560 is irradiated, whereby an electrostatic latent image is formed on the photosensitive element 515 by using toner.

The transfer sheet is conveyed by a conveying belt 516 at the same speed as the rotation speed of the photosensitive element 515, while the toner image, which has been formed on the photosensitive element 515 as an electrostatic latent image, is transferred. Afterwards, the image is fixed by a fixing unit 517, and then the transfer sheet is conveyed to a discharge unit 518. The transfer sheet conveyed to the discharge unit 518 is discharged into a discharge tray 519 if it is not in a staple mode.

According to an aspect of the present invention, it is possible to properly control a light source that includes a combination of light emitters that each have different response characteristics with respect to a drive current.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light-source control device comprising:
   a light source having a load current applied thereto, the light source including a first light emitter for emitting light and a second light emitter for emitting light by exciting material therein in response to the light emitted by the first light emitter;
   a control unit configured to control the load current applied to the light source so that a rise transition time and a fall transition time of the load current applied to the light source are nearly equal to each other;
   a constant current maintaining unit configured to maintain a source current, input via the light source and the control unit from a power supply, at a constant magnitude, the source current being based on the load current; and
   a switching unit configured to switch the source current input, via the light source and the control unit, to the constant current maintaining unit at a designated duty ratio and cycle.

2. The light-source control device according to claim 1, wherein the control unit controls the load current applied to the first light emitter so that a rise transition time and a fall transition time of the load current applied to the first light emitter is nearly equal to a response time during lighting-up and a response time during lighting-down of the second light emitter.

3. The light-source control device according to claim 2, wherein the control unit includes a capacitor that is connected to the light source in parallel.

4. The light-source control device according to claim 2, wherein
   the control unit includes a capacitor connected to another power source, and
   a current from the another power source is further input to the constant current maintaining unit via the capacitor.

5. The light-source control device according to claim 1, wherein the second light emitter is a fluorescent material.

6. The light-source control device according to claim 1, wherein the second light emitter is a phosphor.

7. The light-source control device according to claim 1, wherein the control unit controls the load current applied to the first light emitter so that a rise transition time and a fall transition time of the load current applied to the first light emitter become nearly equal to each other.

8. The light-source control device according to claim 7, wherein the control unit includes a capacitor that is connected in parallel to a load resistor for the source current in the constant current maintaining unit.

9. The light-source control device according to claim 7, wherein the control unit controls the load current applied to the first light emitter so that the load current applied to the first light emitter has a substantially rectangular wave.

10. An image reading device comprising:
    the light-source control device according to claim 1; and
    a light receiving unit configured to receive reflected light of light emitted by the light source and convert the reflected light into an electric signal.

11. An image forming apparatus comprising:
    the light-source control device according to claim 1;
    a light receiving unit configured to receive reflected light of light emitted by the light source and convert the reflected light into an electric signal; and
    an image forming unit configured to form an image in accordance with the electric signal output from the light receiving unit.

12. A light-source control device comprising:
    a light source having a load current applied thereto, the light source including a first light emitter for emitting light and a second light emitter for emitting light by exciting material therein in response to the light emitted by the first light emitter;
    a control means for controlling the load current applied to the light source so that a rise transition time and a fall transition time of the load current applied to the light source are nearly equal to each other;
    a constant current maintaining means for maintaining a source current, input via the light source and the control means from a power supply, at a constant magnitude, the source current being based on the load current; and
    a switching means for switching the source current input, via the light source, to the constant current maintaining means at a designated duty ratio and cycle.

13. A light-source control method comprising:
- maintaining, by a constant current maintaining unit, a source current, input via a light source from a power supply, at a constant magnitude, the light source having a load current applied thereto, the light source including a first light emitter for emitting light and a second light emitter for emitting light by exciting material therein in response to the light emitted by the first light emitter;
- switching the source current input, via the light source, to the constant current maintaining unit at a designated duty ratio and cycle; and
- controlling the load current applied to the light source so that a rise transition time and a fall transition time of the load current applied to the light source are nearly equal to each other.

14. The light-source control method according to claim 13, wherein the controlling includes controlling the load current applied to the first light emitter so that a rise transition time and a fall transition time of the load current applied to the first light emitter is nearly equal to a response time during lighting-up and a response time during lighting-down of the second light emitter.

15. The light-source control method according to claim 13, wherein the controlling includes controlling the load current applied to the first light emitter so that a rise transition time and a fall transition time of the load current applied to the first light emitter become nearly equal to each other.

* * * * *